United States Patent [19]
Bisset et al.

[11] Patent Number: 5,825,352
[45] Date of Patent: Oct. 20, 1998

[54] MULTIPLE FINGERS CONTACT SENSING METHOD FOR EMULATING MOUSE BUTTONS AND MOUSE OPERATIONS ON A TOUCH SENSOR PAD

[75] Inventors: Stephen J. Bisset, Palo Alto; Bernard Kasser, Menlo Park, both of Calif.

[73] Assignee: Logitech, Inc., Fremont, Calif.

[21] Appl. No.: 608,116

[22] Filed: Feb. 28, 1996

Related U.S. Application Data

[63] Continuation of Ser. No. 582,768, Jan. 4, 1996, abandoned.

[51] Int. Cl.⁶ .............................. G09G 5/00; G09G 5/08
[52] U.S. Cl. ........................................... 345/173; 345/157
[58] Field of Search .................................. 345/156, 157, 345/160, 173, 174, 145; 178/18; 341/33

[56] References Cited

U.S. PATENT DOCUMENTS

| | | | |
|---|---|---|---|
| 3,921,166 | 11/1975 | Volpe . | |
| 4,103,252 | 7/1978 | Bobick | 345/174 |
| 4,455,452 | 6/1984 | Schuyler | 345/173 |
| 4,550,221 | 10/1985 | Mabusth | 345/173 |
| 4,639,720 | 1/1987 | Rympalski et al. | 345/174 |
| 4,686,332 | 8/1987 | Greanias et al. | 345/173 |
| 4,733,222 | 3/1988 | Evans | 341/33 |
| 4,736,191 | 4/1988 | Matzke et al. | 345/157 |
| 4,914,624 | 4/1990 | Dunthorn | 345/173 |
| 5,016,008 | 5/1991 | Gruaz et al. | 345/173 |
| 5,203,704 | 4/1993 | McCloud | 434/156 |
| 5,327,161 | 7/1994 | Logan et al. | 345/173 |
| 5,365,461 | 11/1994 | Stein et al. | 364/550 |
| 5,376,946 | 12/1994 | Mikan | 345/173 |
| 5,432,531 | 7/1995 | Calder et al. | 345/173 |
| 5,442,376 | 8/1995 | Tannenbaum et al. | 345/156 |
| 5,463,388 | 10/1995 | Boie et al. | 341/33 |
| 5,495,077 | 2/1996 | Miller et al. | 345/173 |
| 5,528,266 | 6/1996 | Arbeitman et al. | 345/173 |
| 5,543,591 | 8/1996 | Gillespie et al. | 178/18 |
| 5,565,658 | 10/1996 | Gerpheide et al. | 345/174 |
| 5,648,642 | 7/1997 | Miller et al. | 178/18 |

FOREIGN PATENT DOCUMENTS

| | | |
|---|---|---|
| WO 91/03039 | 3/1991 | WIPO . |
| WO 97/18508 | 5/1997 | WIPO ............................. G06F 3/033 |

OTHER PUBLICATIONS

Synaptics Brochure, "Synaptics Touch Pad," pp. 1–39.

Primary Examiner—Jeffery Brier
Assistant Examiner—Paul A. Bell
Attorney, Agent, or Firm—Townsend and Townsend and Crew

[57] ABSTRACT

Method and apparatus for detecting an operative coupling between one or more fingers or other appropriate objects and a touch pad includes processes for detection of multiple maxima with intermediate minima in appropriate sequences to emulate the operations of cursor control and button actuations in a pointing and control device.

31 Claims, 17 Drawing Sheets

MULTIPLE FINGERS CONTACT SENSING METHOD FOR EMULATING MOUSE BUTTONS AND MOUSE OPERATIONS ON A TOUCH SENSOR PAD

RELATED APPLICATION

This application is a continuation of U.S. patent application Ser. No. 08/582,768, filed Jan. 4, 1996, abandoned.

FIELD OF THE INVENTION

The present invention relates generally to touchpad devices, and more particularly relates to touchpad devices which detect at least the presence of one or more objects such as fingers to effectuate preselected control functions.

BACKGROUND OF THE INVENTION

Touch sensing devices are well known, and take a number of different forms. Perhaps the best known are resistive-membrane position sensors, which have been used in a number of different applications for many years. Such devices have been used as keyboards, position indicators, and so forth. Other types of touch sensing devices include resistive tablets, surface acoustic wave devices, touch sensors based on strain gages or pressure sensors, and optical sensors.

Yet another touch sensing technology is capacitive sensing, in which the location of a finger (or in some instances another object such as a stylus) over a sensing device is determined by virtue of variations in capacitance under and around the location of the finger. Typical of capacitive touch sensing devices are touch screens and capacitive pads which employ a matrix of row and column electrodes and detect, for example, either the transcapacitance between row and column electrodes or the effective capacitance to virtual ground. Other capacitive techniques are also known. Some touch sensitive devices are known to use interpolation for more precisely identifying the location of a finger or stylus.

Typical of each of these prior art devices is that each of them senses any contact as that of only one finger at a time. Cursor movement is straightforward with one finger, and tapping of a finger on the surface of the pad can be detected and acted upon in a manner similar to detecting the actuation of a button on a mouse. Single and double taps can be used as simple equivalents of single and double mouse clicks.

With a single-finger touchpad, the click and drag function is more difficult. With single finger detection, dragging has been implemented with schemes such as uptap (finger lifted and placed down again quickly), tap-and-a-half, and sticky drag (drag lock turns on automatically after the finger is placed in one location without moving for more than a certain time, such as one second). All of these methods take more time and/or more finger motions than it takes to perform the equivalent function with a mouse, and are not intuitive to users familiar with electronic mice. Prior art touch pads are thus less attractive for general use than a mouse.

Another commonly used function in the prior art is that of clicking a box (or icon or displayed "button") or series of boxes (such as "connecting the dots"). With a mouse, the cursor is moved into position by moving the mouse, then the click occurs with a down-up motion of the finger to actuate a button or switch. With a touchpad typical of the prior art, the cursor is moved into position with the finger, then the click occurs with a tap of the finger which moved the cursor. This requires an up-down-up-down finger motion to do the same thing as simply the "down-up" motion of the mouse button. In general, any touchpad equivalent to a mouse button-clicking function requires an extra "up . . . up" motion of the finger, because the finger must be lifted off the pad before and after the tap.

The time and stress associated with the extra motion is significant. Human factors studies have shown that such touchpads yield lower productivity than a mouse in many applications. This somewhat limits touchpads to those applications, such as portable computing, where use of a mouse is inconvenient due to space or other considerations. There is therefore a need for a touchpad capable of yielding the same productivity as a mouse.

SUMMARY OF THE INVENTION

The present invention provides a novel method and apparatus for sensing the proximity of multiple simultaneous fingers or other appropriate objects to a touch sensor. The present invention may be implemented based on any conventional touch sensing technology, although an exemplary embodiment involves the use of a capacitive touch sensing device similar to that described in U.S. patent application Ser. No. 08/478,290, entitled Touch Sensing Method and Apparatus, filed Jun. 7, 1995, and assigned to the assignee of the present application. The numerous modifications to such a basic device required to implement the present invention are described generally below, and in detail hereinafter. Alternatively, the present invention may be used with the method and apparatus described in the U.S. patent application Ser. No. 08/582,769, entitled Touch Pad Sensing Method and Apparatus, having as inventors Bemi Joss, Bernard Kasser and Stephen Bisset, filed on Jan. 4, 1996, and assigned to the assignee of the present invention, the relevant portions of which are incorporated herein by reference.

Operation of the present invention includes two aspects: detection of multiple objects, typically fingers, and assignment of various functions to particular actions by the movement of one or both fingers. The detection function can be general, but in a simple, exemplary implementation can be limited to a two-finger function such as the combination of the index finger and middle finger. In general, these are the two most dextrous fingers, and they work well together. As a result, for this exemplary embodiment, the touchpad need only distinguish between the two fingers in one dimension since the two fingers are typically side by side. In addition, the touchpad need only detect the second finger in reasonably close proximity to the first finger. In most situations, the distance between finger centers will be less than five centimeters. Additional combinations of fingers, such as three fingers tapping simultaneously or other combinations, may also be implemented in accordance with the methodology of the present invention.

For clarity of explanation, the present invention can be described in most of its applications by establishing one finger as controlling movement of the cursor, and the second finger as controlling functions equivalent to a mouse button or switch. In this context, one finger may be considered the "point" finger, while the other is the "click" finger. Various conventional functions may then be defined accordingly. For example, "drag" may be effected by moving the two fingers in unison, "point and click" may be effected by moving the cursor with the first finger and tapping with the second finger, "point and double click" may be effected by moving the cursor with the first finger and double tapping with the second finger, and so on. "Click and Drag" may be performed simply by moving the cursor to the appropriate position with the first finger, placing both first and second fingers on the pad, and moving both fingers together. The function may be concluded by simply raising one or both fingers. Similarly, connecting the dots may be performed simply by moving the cursor from dot to dot with the first finger, and then clicking on the dot by tapping with the second finger. It will be apparent to those skilled in the art that these functions may be defined differently and still fall within the scope of the present invention. It will also be apparent that many of these operations will be intuitive to experienced mouse users, as soon as the correspondence between mouse functions and the two fingers is demonstated to the user, and thus their implementation in a touchpad context makes them especially desirable.

In addition to the foregoing functions, which can be performed (albeit awkwardly and less intuitively) with conventional touch pads, there are additional functions that can be performed with two fingers and which can have substantial analogs to the use of a mouse or even go beyond conventional mouse functions. For example, detection and location of two fingers will permit the touchpad to report to a host system the distance between the two fingers. This can be used, for example, in paint or other programs to determine line width or other spacing functions, or any other "variable value" function. Similarly, tapping with both fingers at the same time may be defined as an alternate, shorthand method for a double tap (such as may be defined for the middle button in a Logitech mouse) or may be defined as a special function, similar to the "right button" functions of a mouse. Such special functions may have particular value in operating systems such as Windows 95 where, for example, implementation of the Object Viewer function is an important special function. Such functions can be implemented readily with a triple finger tap, a double tap of two fingers, or other convenient combination.

Another function which may be implemented with two finger detection is "drag lock". This function may be used when a drag function is underway, but at least one of the fingers reaches the edge of the pad before the drag function is complete. Touchpad operation may be controlled to maintain the drag mode if, for example, both fingers are lifted off the pad within a threshold period of one another, and are then placed down on the pad again within a suitable time period. In some implementations, highly extended time periods may be suitable in this context.

A further function which may be readily implemented with the present invention is the ability to operate in relative mode, where a first finger performs a key function, and a second finger controls some attribute of the operation performed by the first finger. For example, a first finger contacting a touch pad may cause a cursor to move across a screen, while contact (and removal) of a second finger with the screen may turn an image, or "ink" on (and off). The resulting image, or "ink," is defined by the motion of the first finger during the period when the second finger is also in contact with the pad; gaps in the "ink" occur when the second finger is lifted away from the pad. The function may, in some ways, be thought of as electronic finger painting, but has the additional advantage of allowing multiple characters to be written on a touch pad. Thus, with the use of two fingers, hand printing of text with gaps between the letters and words becomes feasible and convenient, whereas it is impractical with the prior art "tap and a half" method of turning on the ink.

Yet another function which may be implemented with the present invention is use of the touchpad in absolute mode.

Most prior art touchpad devices operate, like mice, in relative mode by indicating the distance travelled relative to the starting point of the motion. Touchpads, on the other hand, can also be operated in absolute mode, where the absolute position of the finger on the pad is detected and reported to the host system or application. In absolute mode, multi-finger detection allows the first finger to point to the desired absolute position, while the second finger performs whatever "click" operation is desired without requiring a removal of the first finger which might lessen accuracy or resolution.

Also included within the present invention is the detection and location of more than two fingers, with accompanying functional definitions permitting such multiple contacts to indicate pointing device or other control operations, such as musical keyboards.

It is therefore one object of the present invention to provide a touchpad system capable of detecting a plurality of contacts such as fingers.

It is a further object of the present invention to provide a touchpad device capable of locating a plurality of contacts such as fingers.

It is a further object of the present invention to provide a method for detecting the presence of more than one finger on a touch pad device.

It is a still further object of the present invention to provide a method for locating each of a plurality of fingers on a touch pad device.

It is yet another object of the present invention to provide a method for effecting the "point and click" function on a touchpad through the use of multiple fingers.

Yet a further object of the present invention is to provide a method for effecting the "click and drag" function on a touchpad through the use of multiple fingers.

A still further object of the present invention is to provide a method for effecting on a touchpad, through the use of multiple finger contacts, a plurality of conventional mouse button functions.

Yet another object of the present invention is to provide a method and apparatus for effecting on a touchpad, through the use of multiple finger contacts, a plurality of enhanced functions.

Yet a further object of the present invention is to provide a method and apparatus for electronic finger painting.

These and other objects of the invention may be better appreciated from the following detailed description of the invention, taken together with the appended figures.

THE FIGURES

Figure 2:
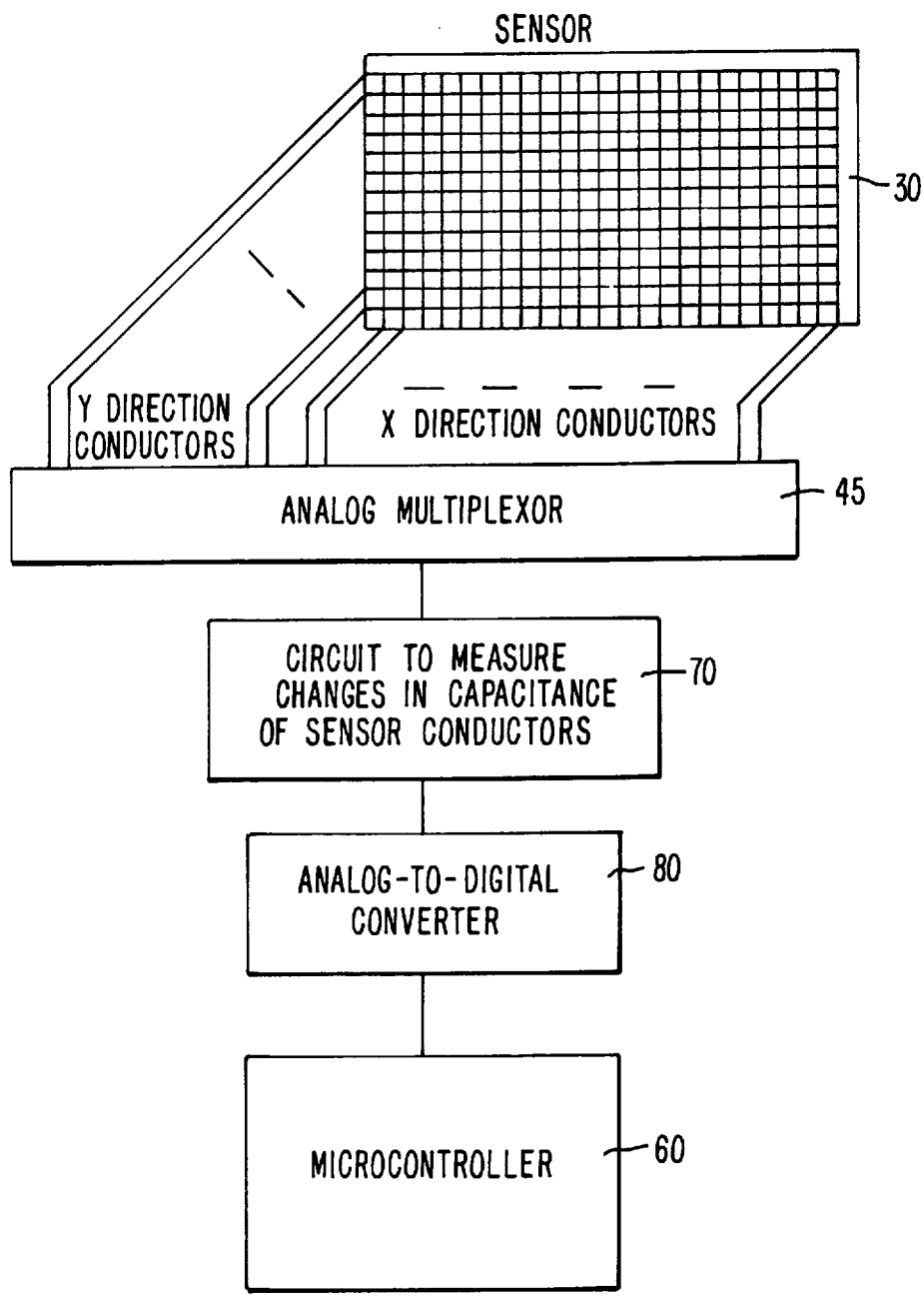
FIG. 2 shows in block diagram form the electronics of the present invention.
Figure 7A:
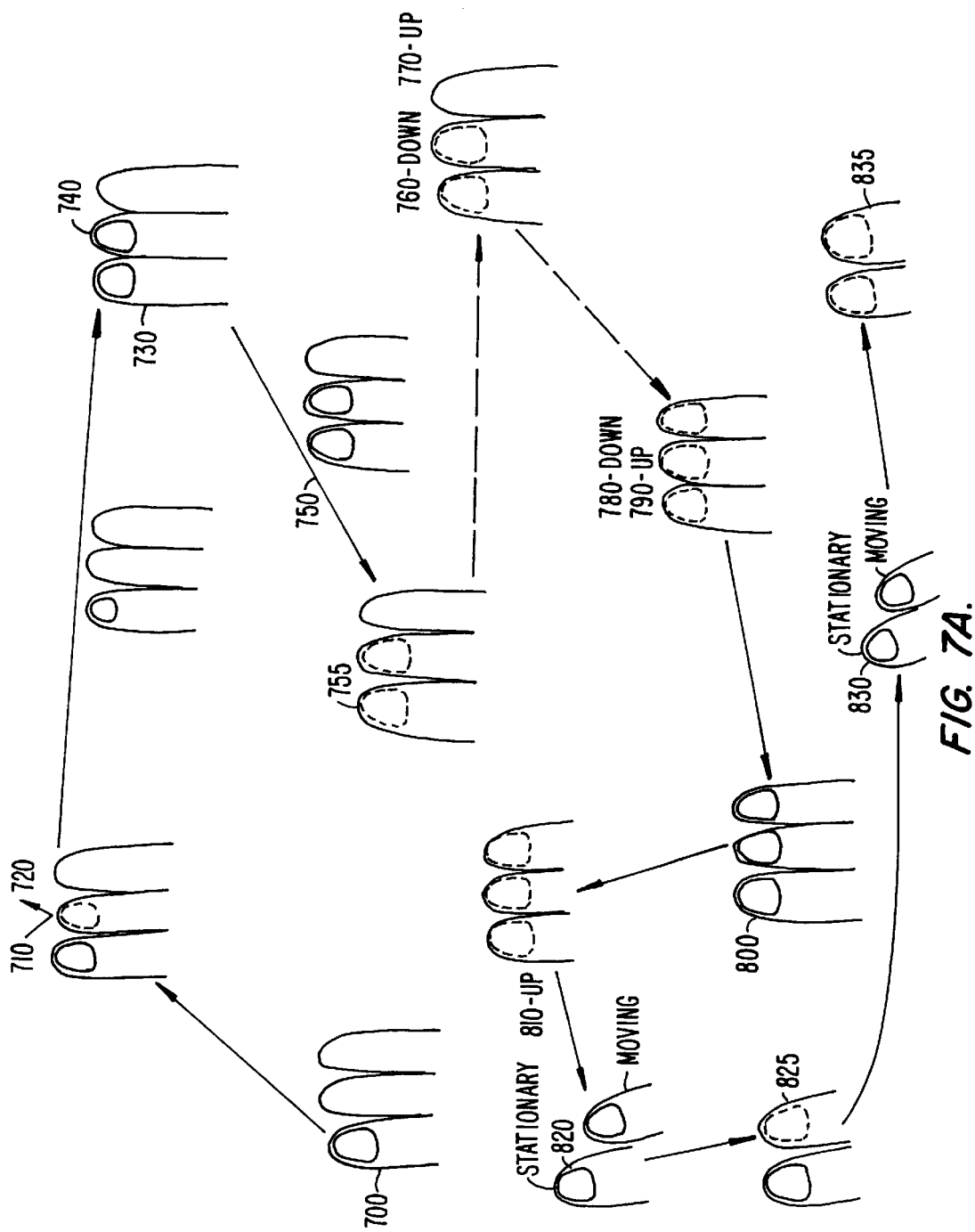
Figure 7B:
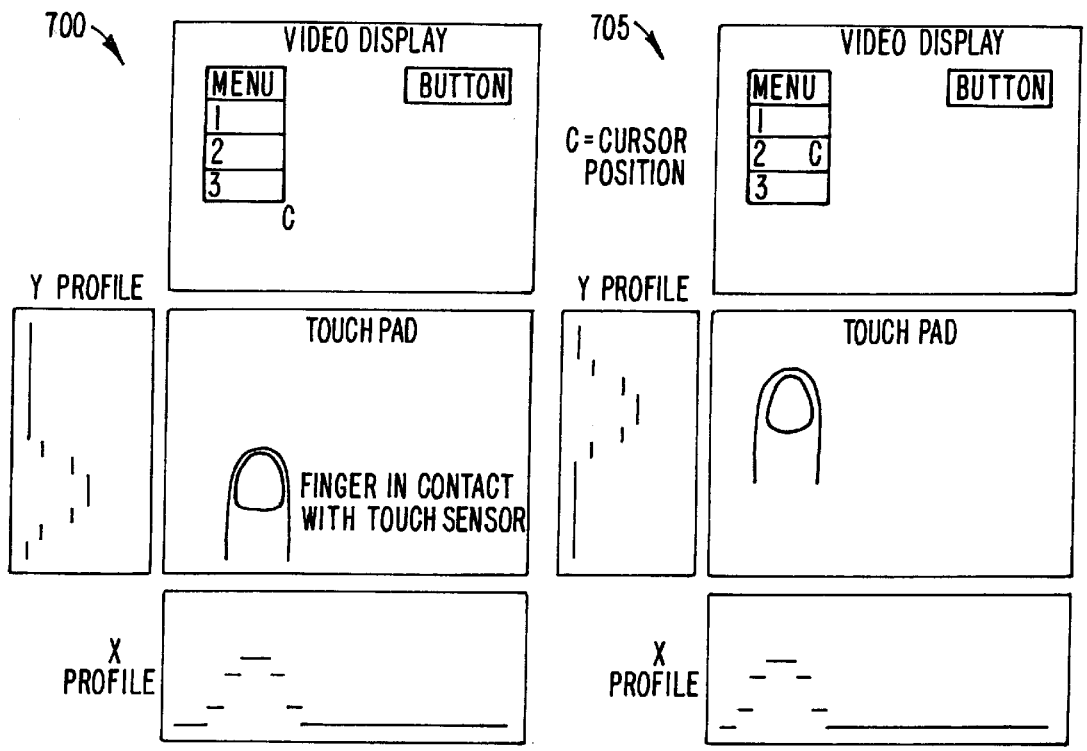
Figure 7B:
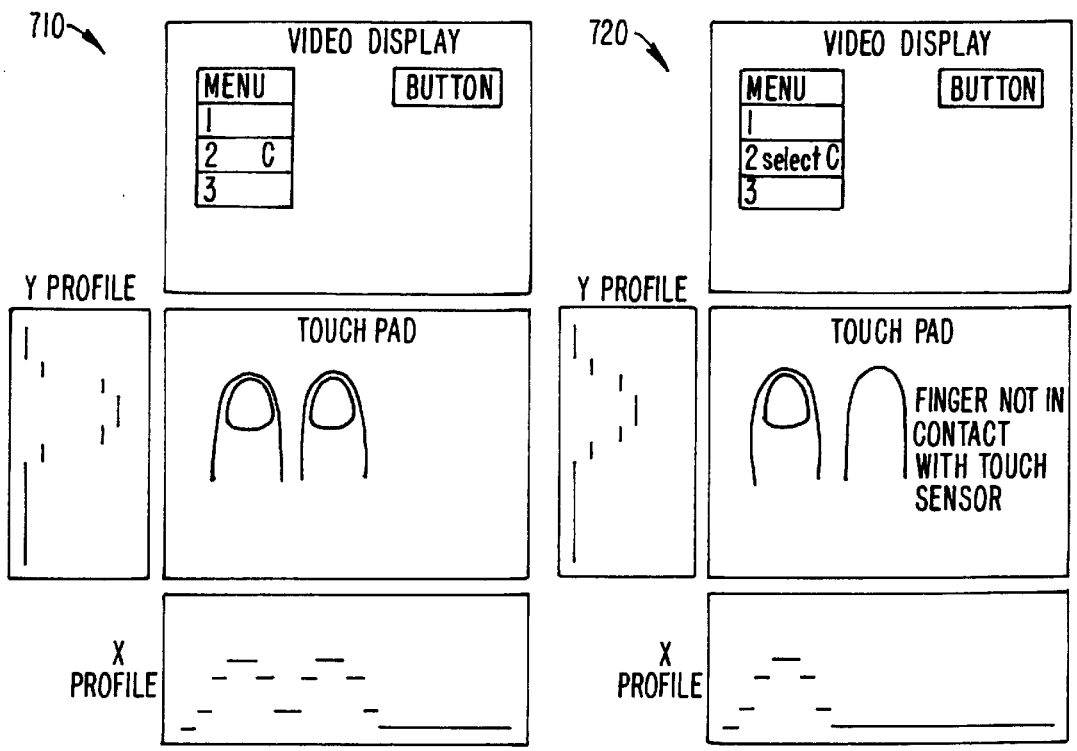
Figure 7C:
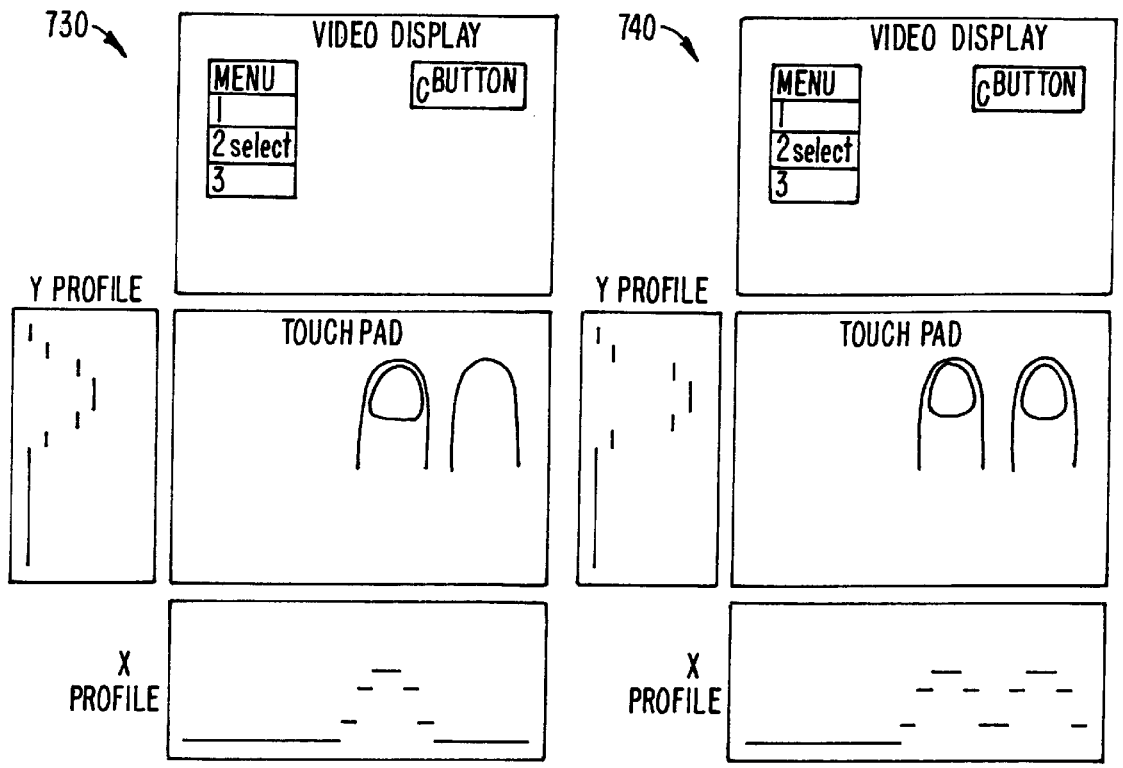
Figure 7C:
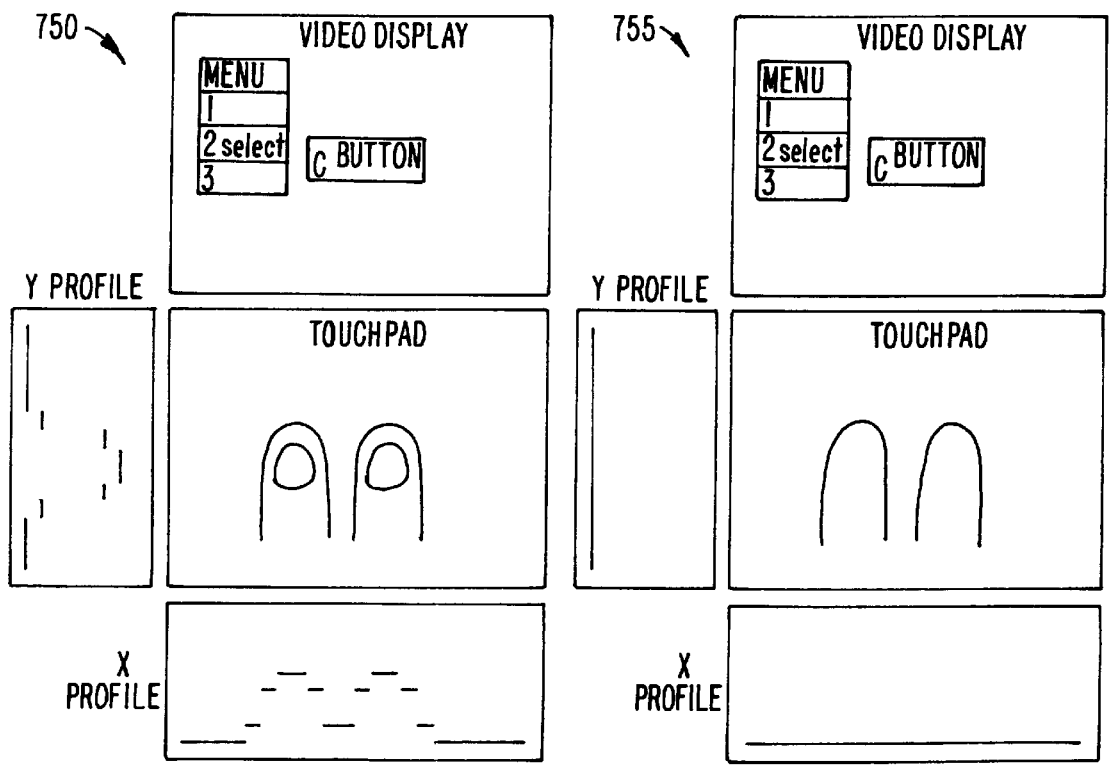
Figure 7D:
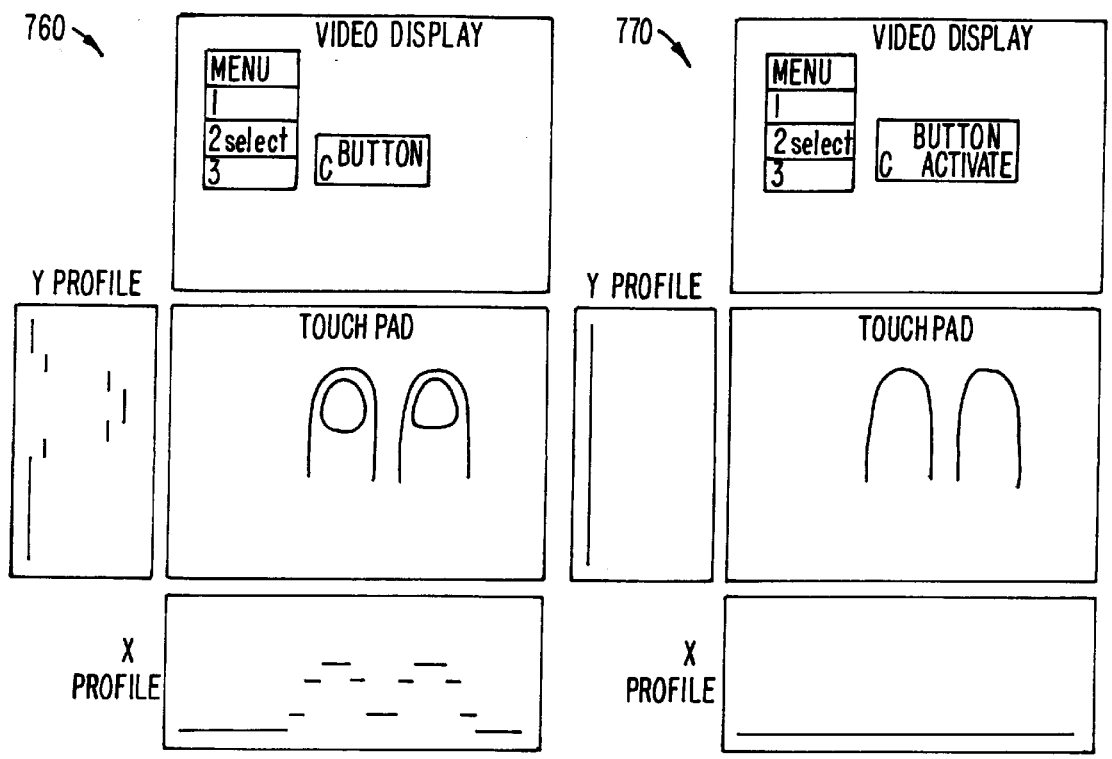
Figure 7D:
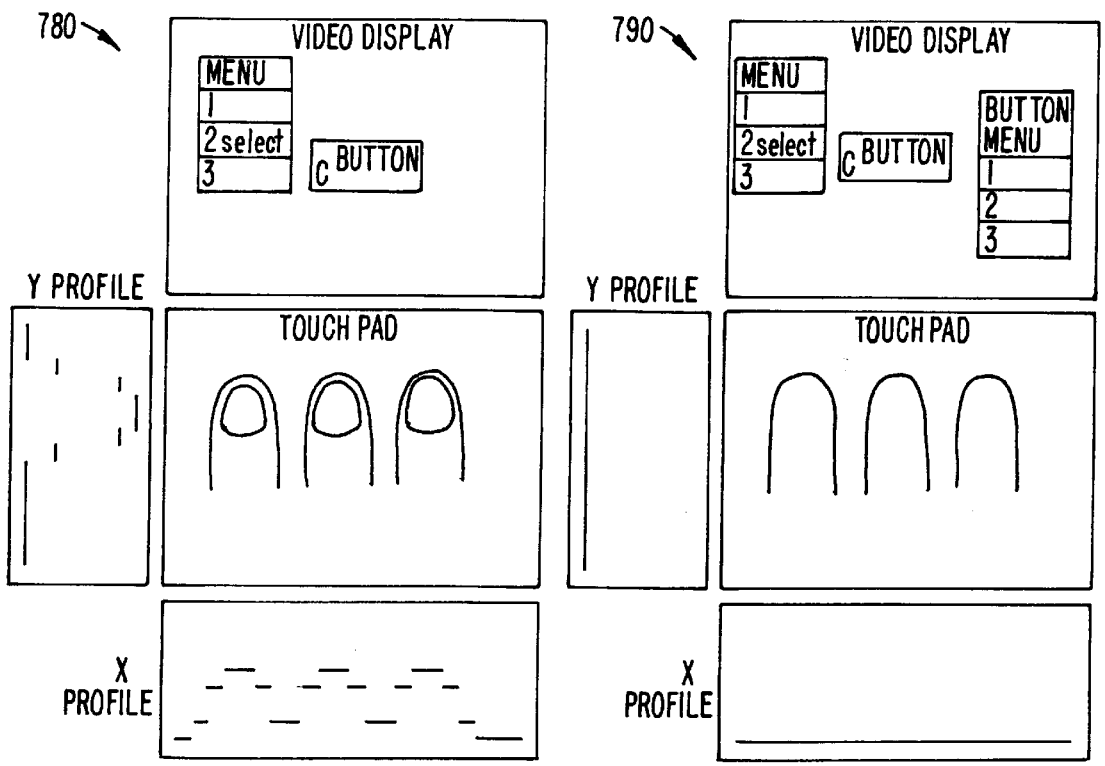
Figure 7E:
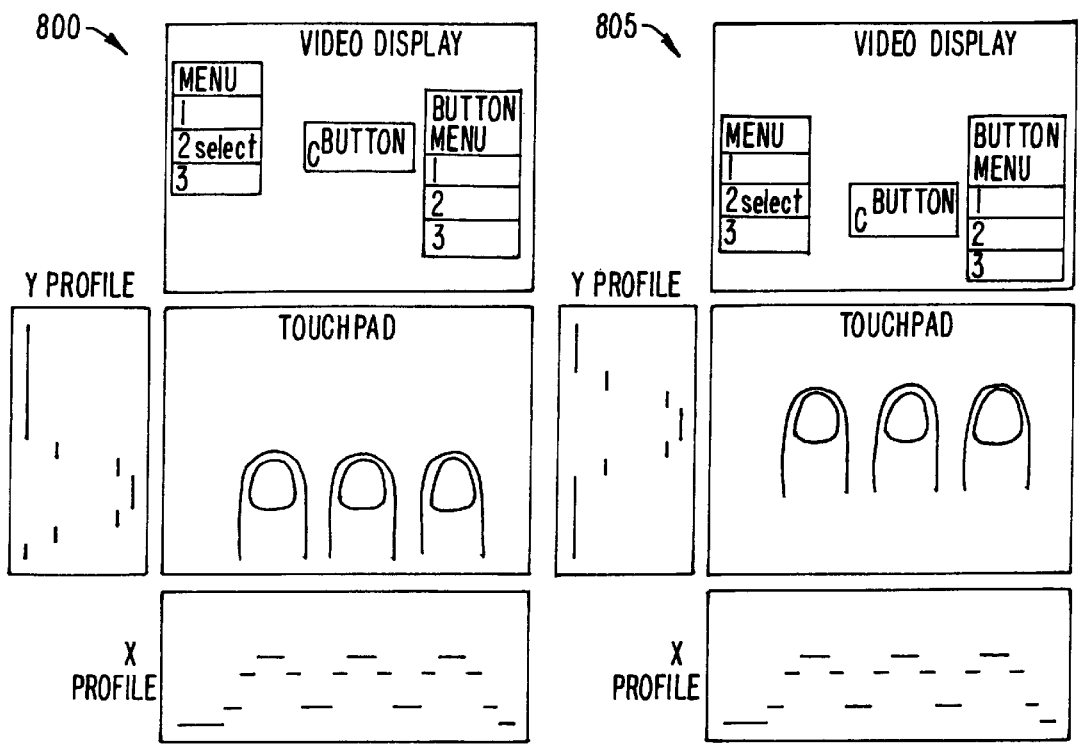
Figure 7E:
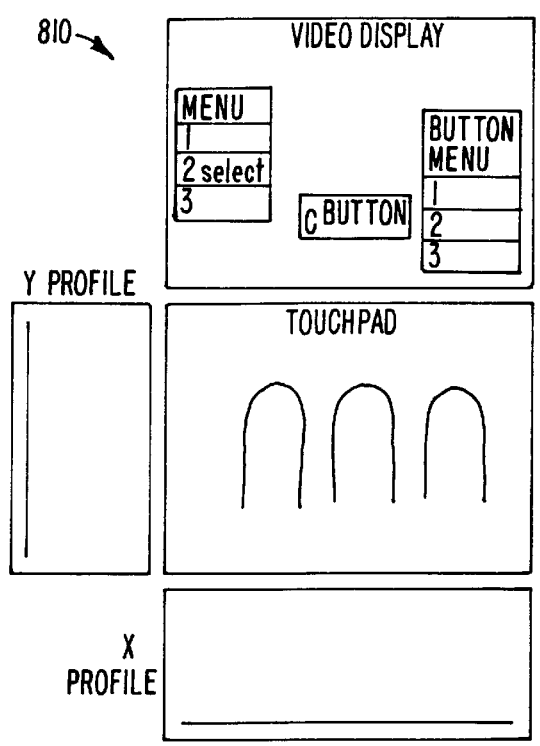
Figure 7F:
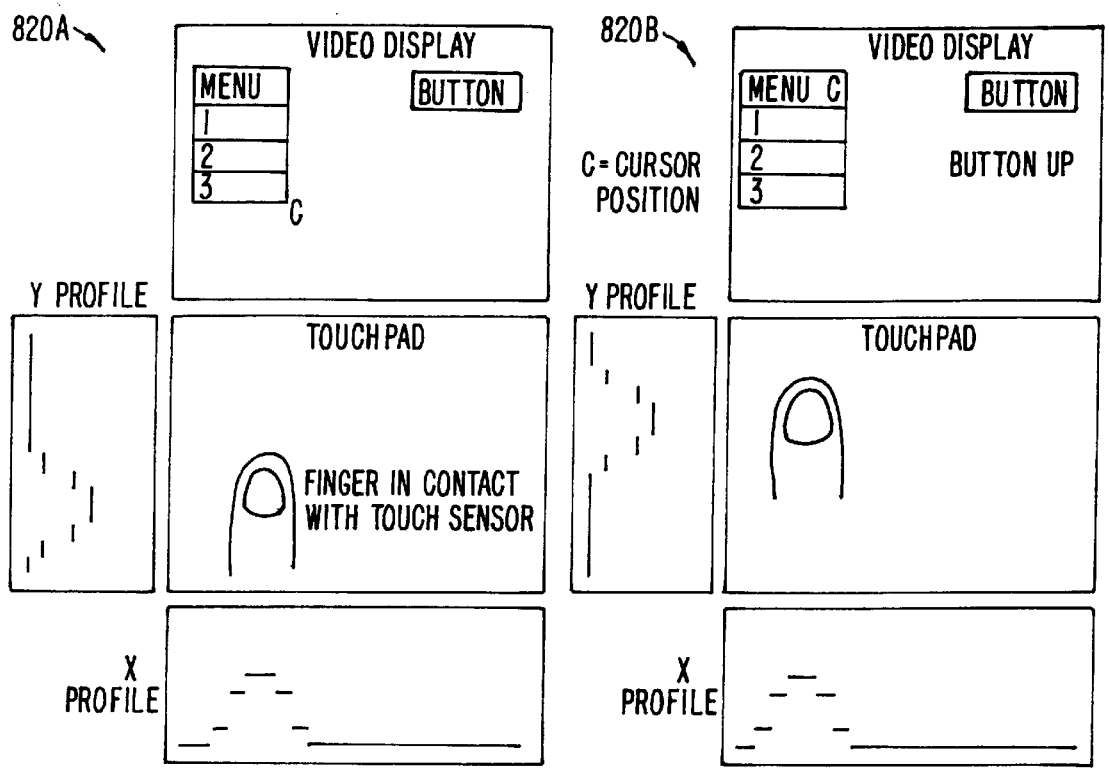
Figure 1:
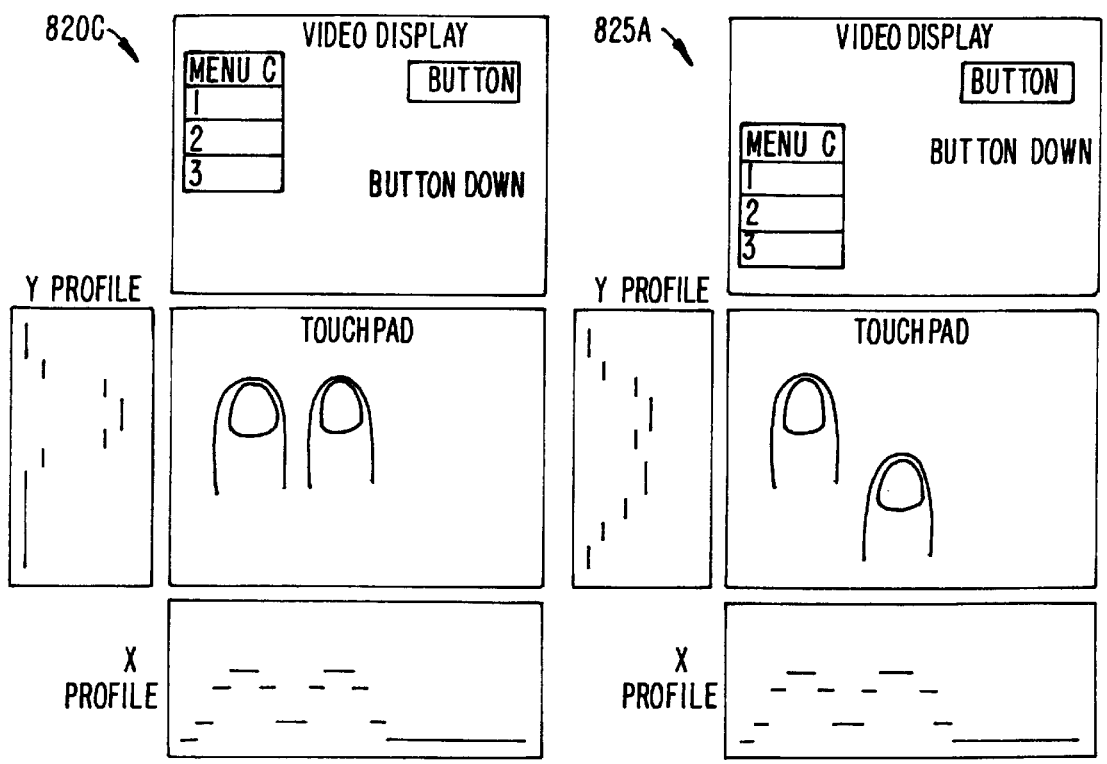
Figure 7F:
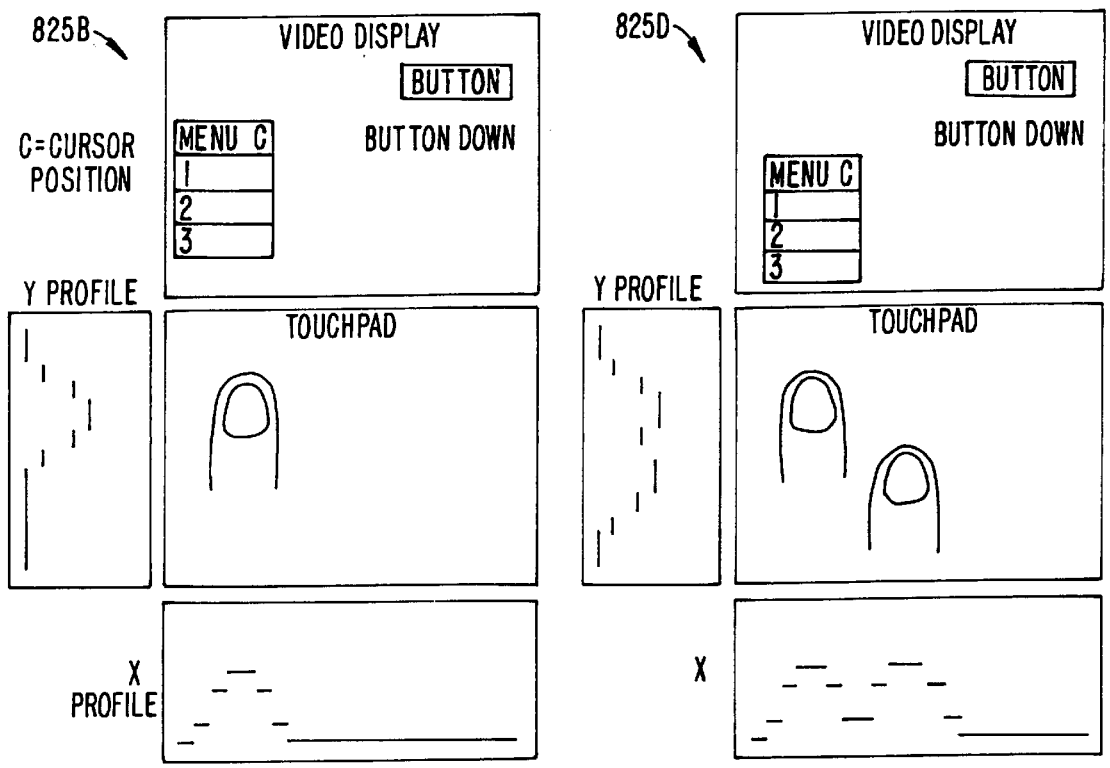
Figure 2:
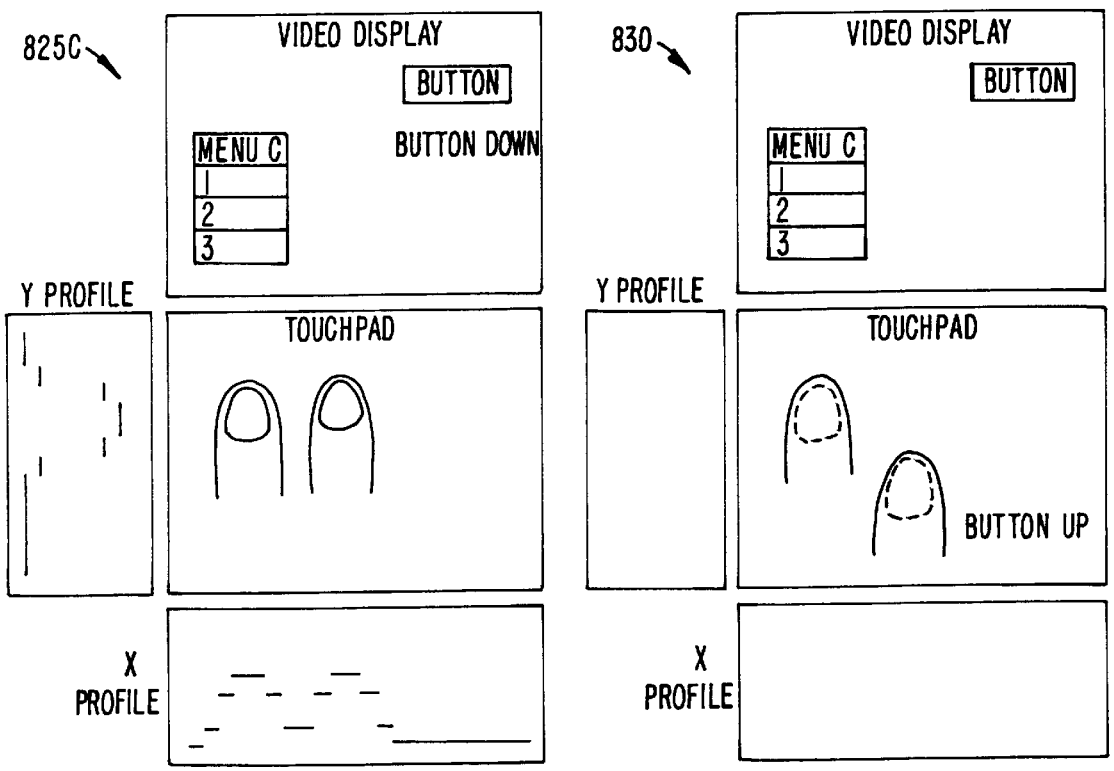

FIGS. 7A–7F2 show in diagrammatic form an exemplary sequence of finger contacts and movements across a touch sensor.

Figure 5:
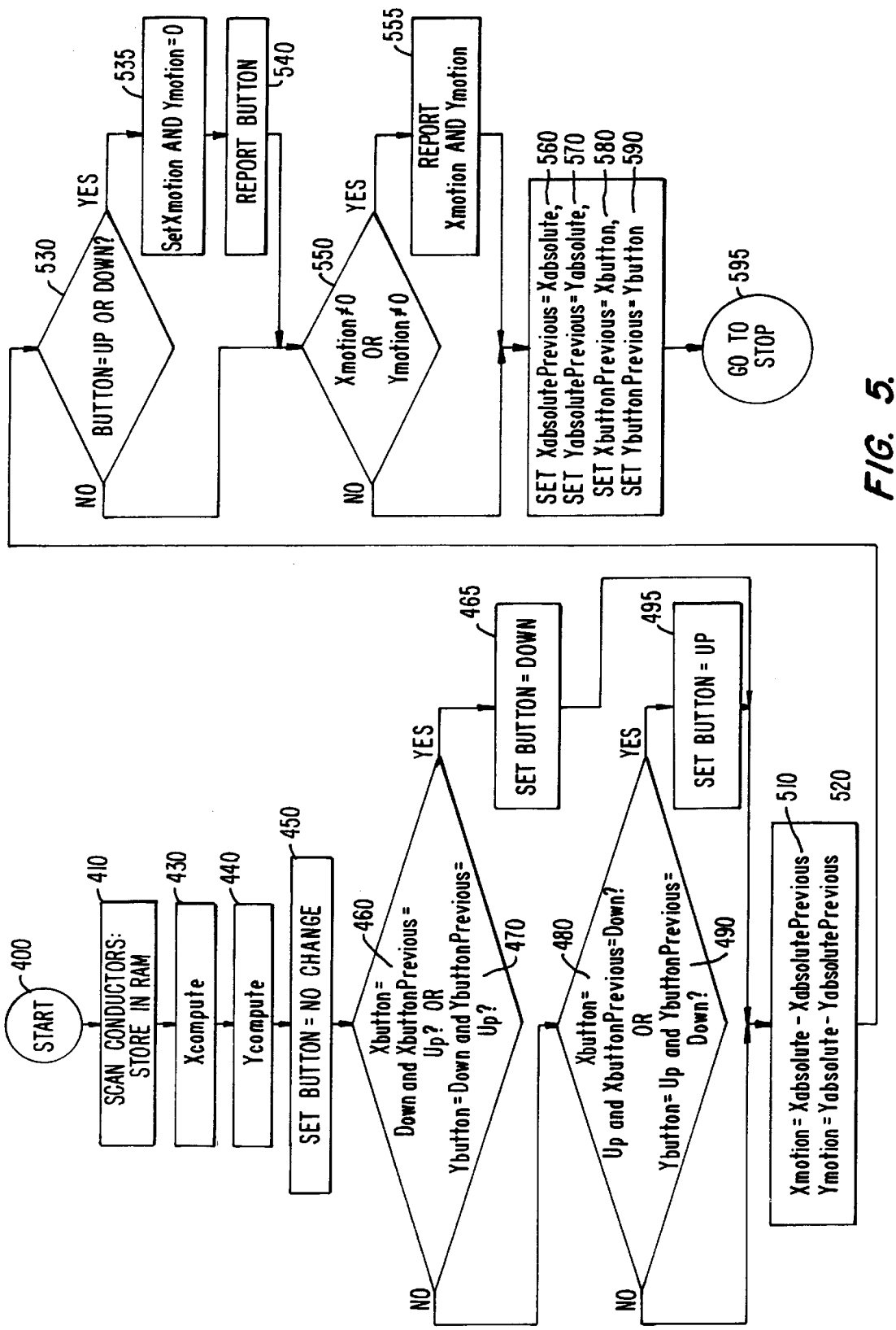
FIG. 5 shows in flow diagram form the steps for a high level algorithm for a pointing device according to the present invention.
Figures 1, 8:
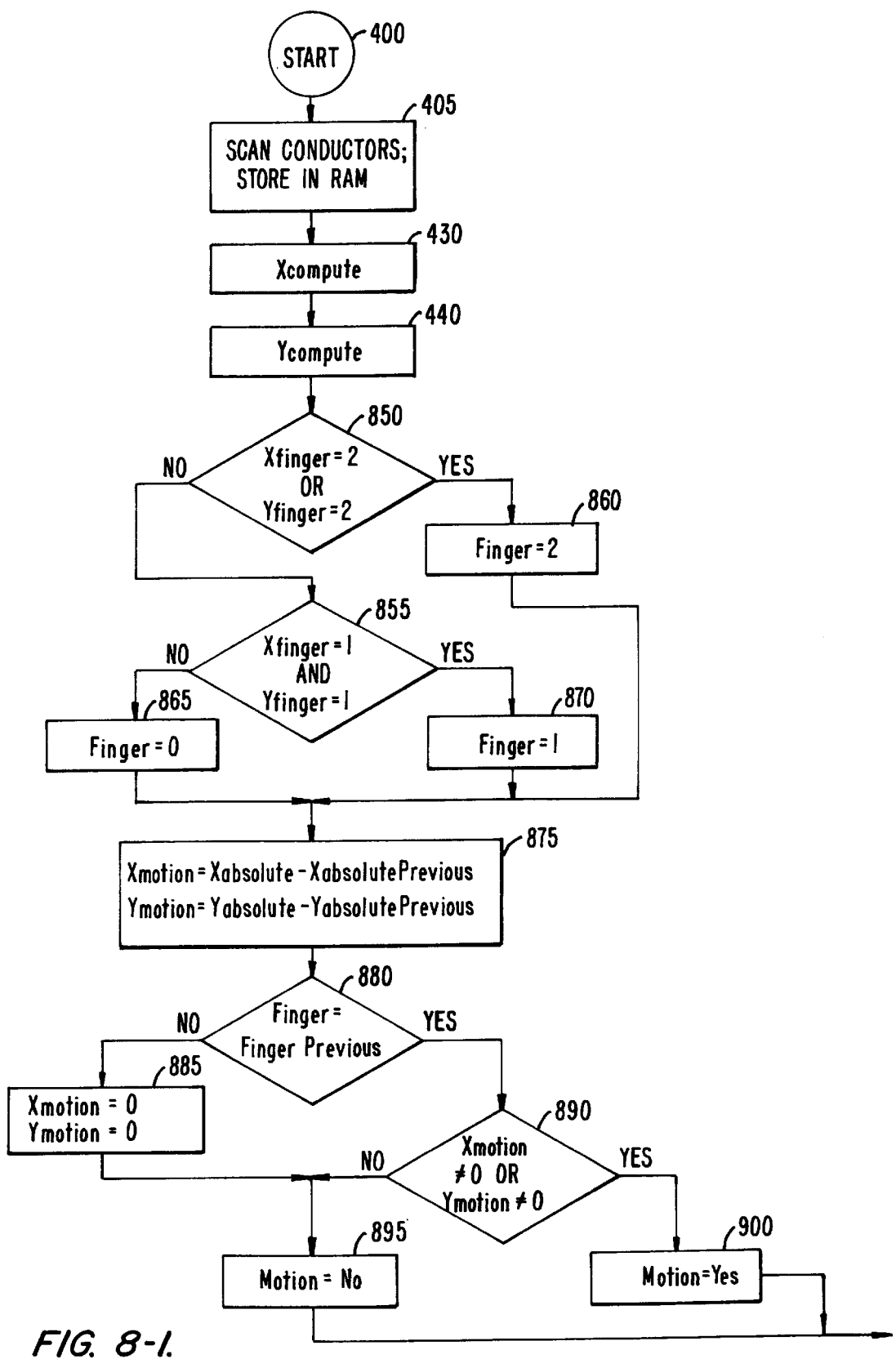
Figures 2, 8:
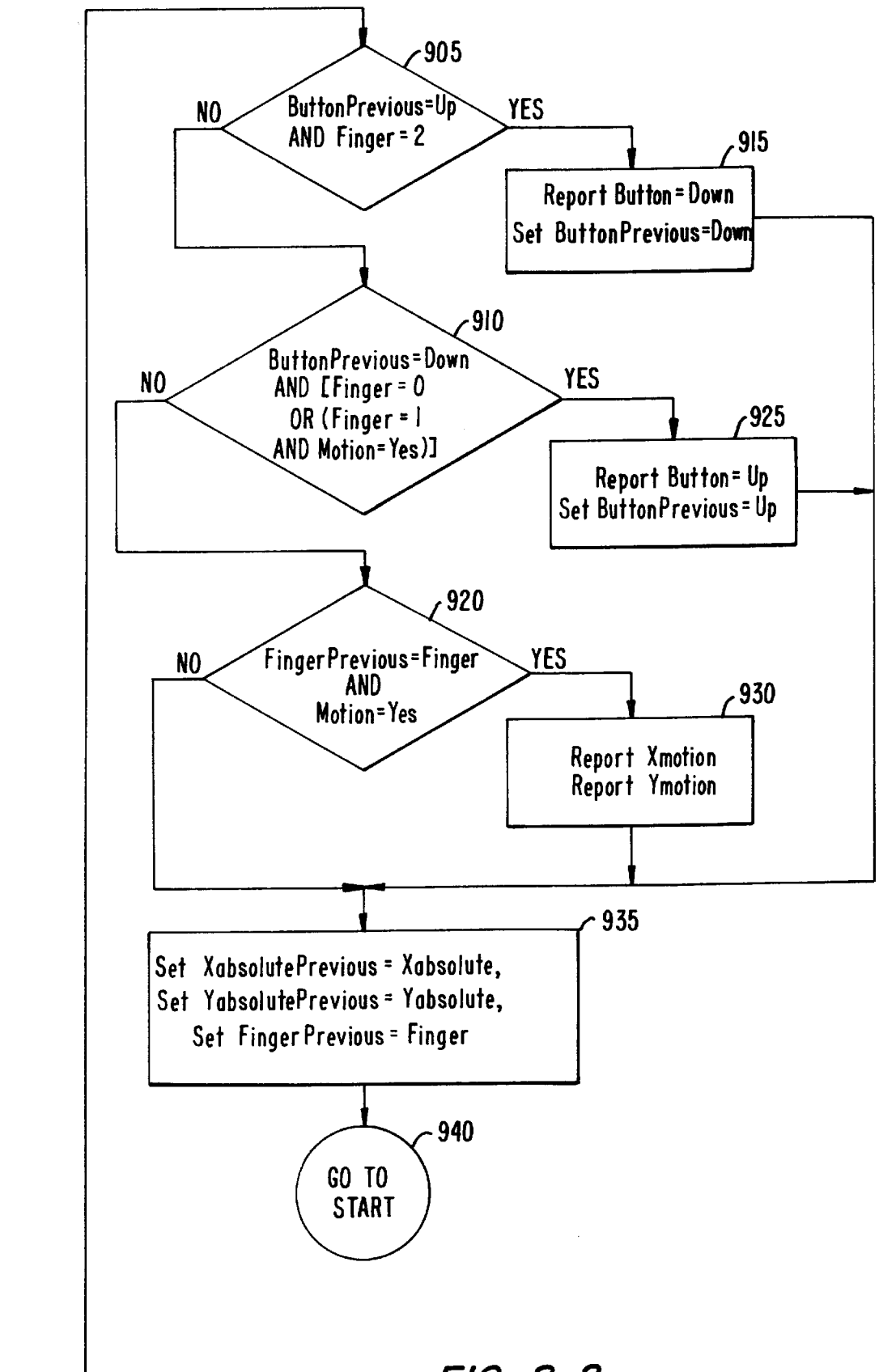
Figures 1, 9:
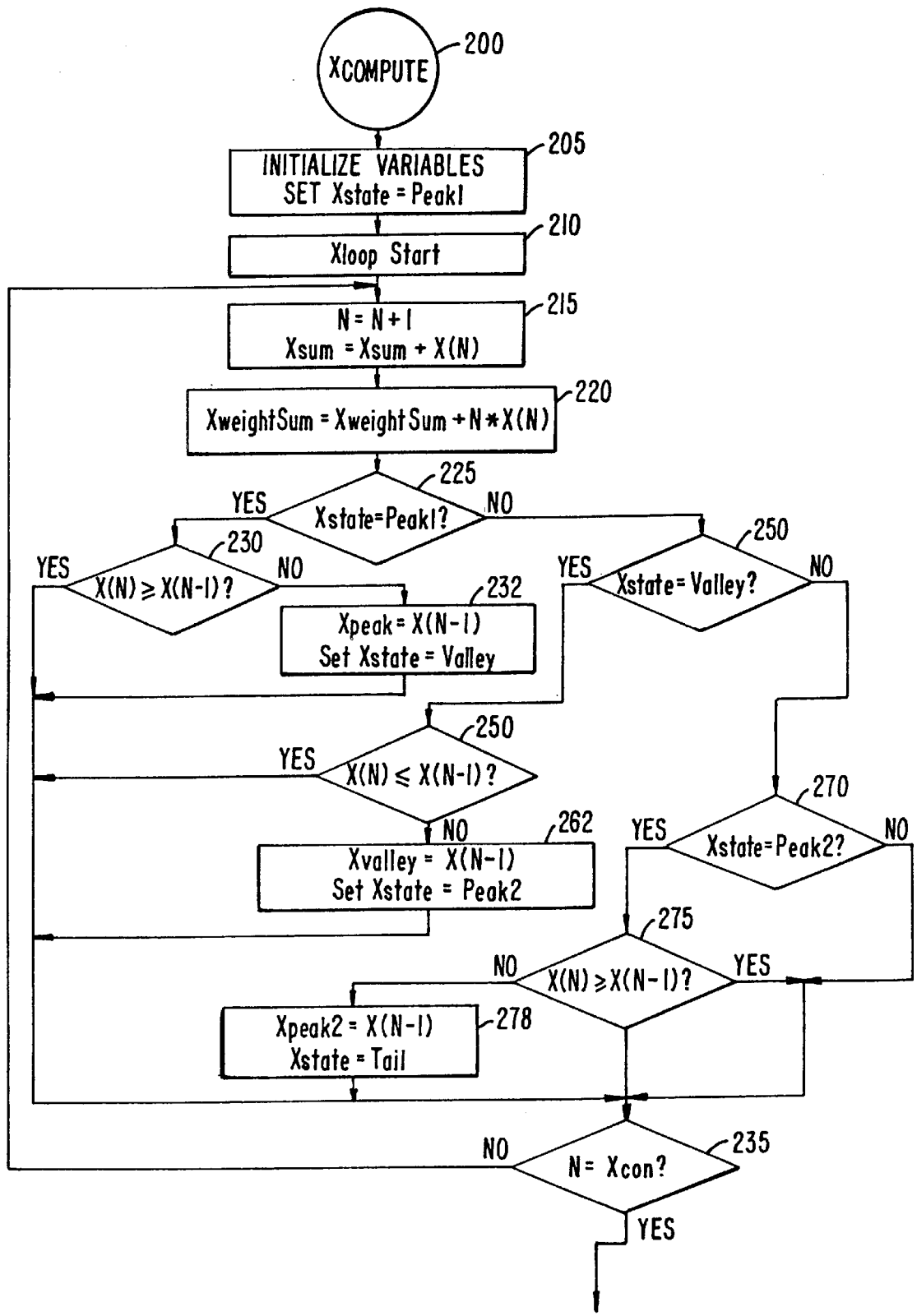
Figures 2, 9:
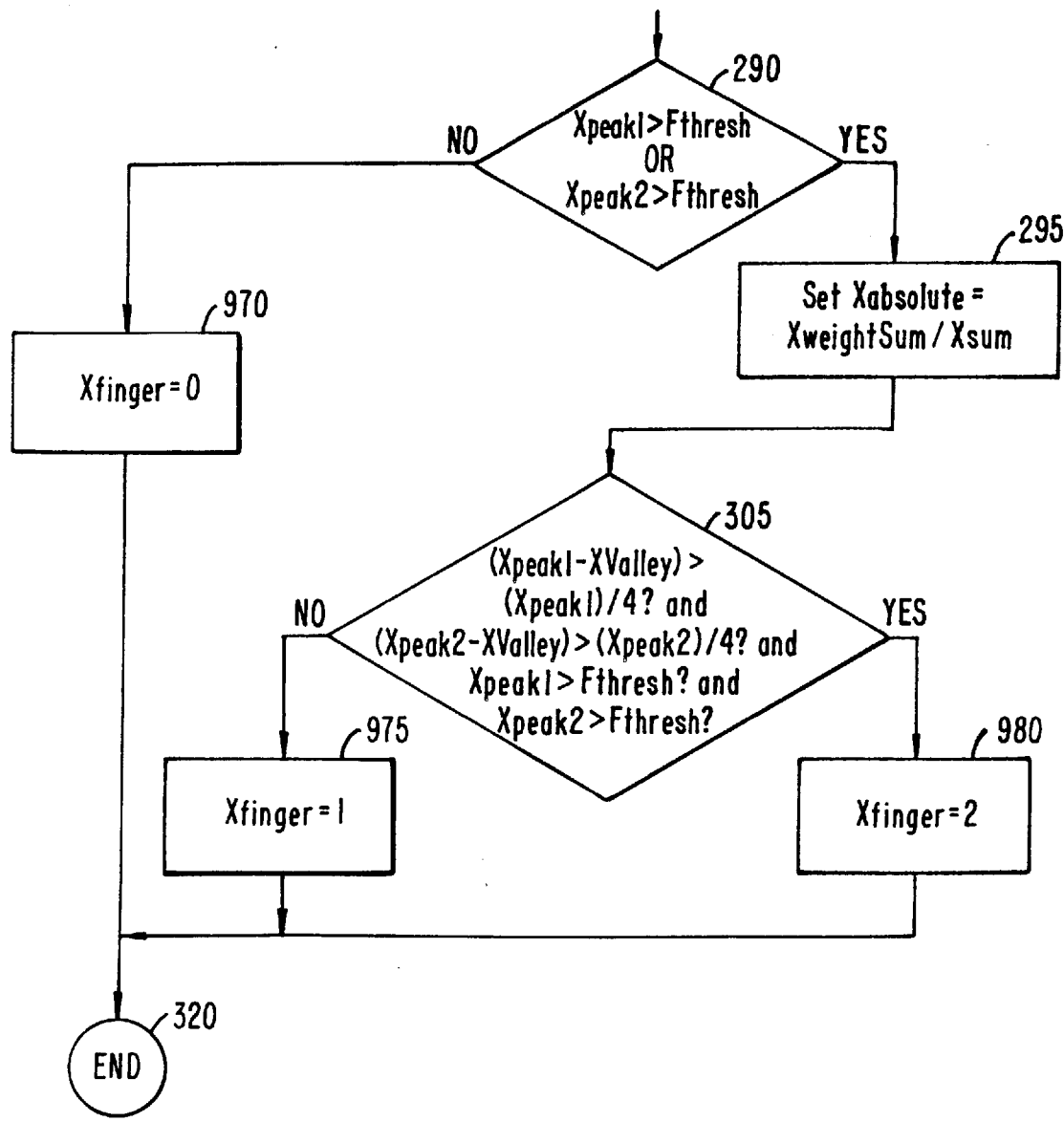

FIG. 8 shows a more generalized case of FIG. 5.
FIG. 9 shows a more generalized case of FIG. 6.

DETAILED DESCRIPTION OF THE INVENTION

Figure 1:
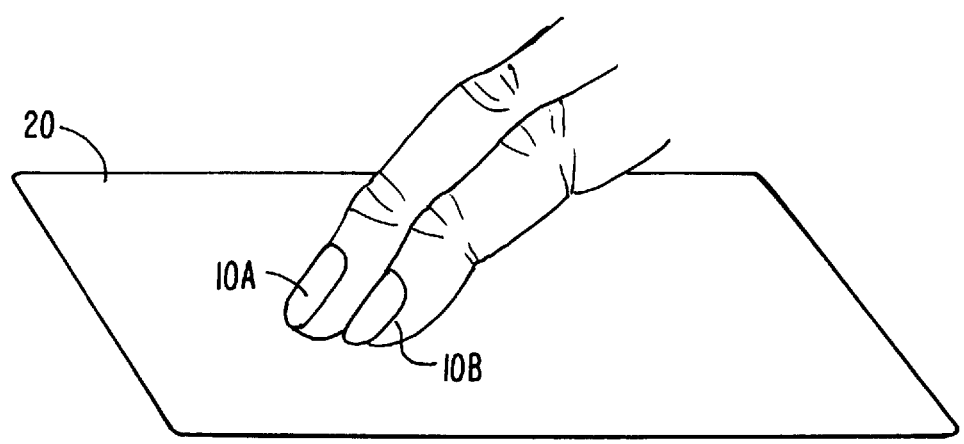
FIG. 1 shows a perspective view of a device according to the present invention.

Referring first to FIG. 1, a plurality of a user's fingers 10A and 10B are shown positioned over a touchpad 20 in sufficiently close proximity to be operatively connected thereto. Movement of a single finger over the touchpad causes the cursor to move in a now-conventional manner. However, unlike prior art devices, various control functions may be performed by the use of the second finger, typically in combination with the same or a related operation of the first finger. Operations involving more than two fingers may also be performed. In an exemplary embodiment, the touchpad of the present invention reports to a host either the relative motion of a finger across the touchpad or changes in "button" status.

Referring next to FIG. 2, the operation of the touchpad 20 may be better appreciated. In particular, FIG. 2 shows in block diagram form the electronics implemented to form an exemplary touchpad 20. A touchpad matrix 30 is composed of a plurality of rows 35 and columns 40 of wires or traces arranged in a conventional manner; see U.S. patent application Ser. No. 08/321,987, filed 12 Oct. 1994, entitled Touch Pad Sensor with Simultaneous Sensing, commonly assigned with the present application. The rows and columns are connected to an analog multiplexor 45 through a plurality of X (row) direction conductors 50 and a plurality of Y (column) direction conductors 55, one conductor for each row and each column. Under the control of a microcontroller 60, the analog multiplexor 45 selects which traces of the matrix 30 will be sampled, and the output of those traces is then provided to a capacitance measuring circuit 70. One suitable capacitance measuring circuit is described in aforementioned U.S. patent application Ser. No. 08/321,987, commonly assigned with the present invention and incorporated herein by reference; another is described in U.S. patent application Ser. No. 08/478,290, filed 7 Jun. 1995, entitled Touch Sensing Method and Apparatus and also commonly assigned with the present invention and incorporated herein by reference.

The output of the capacitance measuring circuit is then provided to an analog to digital converter 80, which operates as described in either of the above-referenced patent applications to convert the capacitance values from the circuit 70 into a digital representation. The analog to digital converter 80 then supplies the signals to the microcontroller 60, which operates to form, among other things, a finger profile for one or more fingers, X-Y cursor data, and control signals. Depending on the operation being performed at the particular time, the output of microcontroller 60 is then supplied to an interface to a PC or other device, such as a PS/2 interface, an RS-232 interface, or an Apple Desktop Bus (ADB).

A key feature of the present invention is its ability to distinguish the presence of multiple fingers either touching or in operative proximity to the touchpad 30. In a typical embodiment, the operation of the circuit of FIG. 2 cycles continuously. As noted above, the cycle begins by scanning the traces and measuring the capacitance on each trace. Then the portion of each measured capacitance that is induced by the presence of a finger is extracted, and this finger-induced capacitance is stored in RAM, as X(1) through X(Xcon) and Y(1) through Y(Ycon), as described below. The finger-induced portion of the measured capacitance is determined by subtracting a value, for each trace, representing the capacitance when no finger is present. This "no-finger" capacitance is measured and stored at a time previous to the beginning of the cycle described herein, and is described more fully in U.S. patent application Ser. No. 08/478,290, filed 7 Jun. 1995 and commonly assigned.

It has also been found by applicant that it is not necessary, in all embodiments, to subtract the "no-finger" capacitance if techniques other than calculation of a centroid are used to locate the position of the fingers, and such subtraction is not required even in all instances in which a centroid is calculated. However, in at least some embodiments the sensitivity and hence the resolution of the calculated finger location is enhanced by such subtraction.

Referring again to the exemplary embodiment, the values of finger-induced capacitance are then processed to calculate a position, detect whether one or more fingers is in operative contact with the pad surface, and to detect any changes in the number of fingers operatively coupled to the pad. If the cycle is repeated rapidly enough to update a graphical user interface approximately 30 times per second or more, the appearance of smooth and instantaneous response is provided to the user. For functions other than pointing, such as handwriting with the finger, a faster scan rate may be required and may, for example, be on the order of 200 scans per second.

Figure 3:
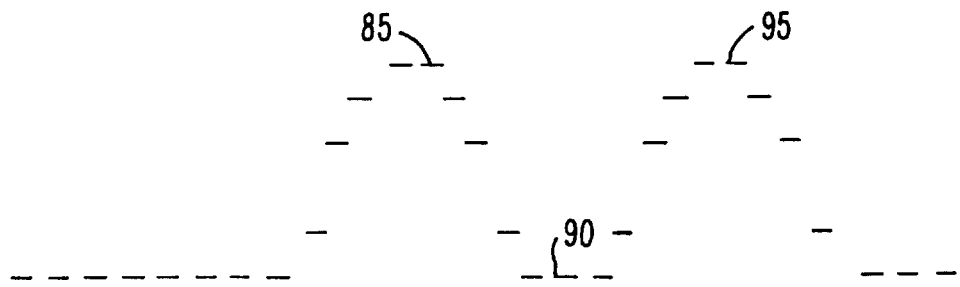
FIG. 3 shows a finger profile for two non-overlapping fingers as sensed by the present invention.

Referring next to FIG. 3, a finger profile is shown indicative of the presence of two fingers, spaced apart from one another. In particular, the circuitry, software or firmware of the touchpad circuitry, such as that shown in FIG. 2, detects a first maxima 85 indicative of a first finger in operative proximity to the touchpad 30, followed by a minima 90 indicative of a space between the fingers, and further followed by another maxima 95 indicative of a second finger operatively coupled to the touchpad 30. It will be appreciated that, for operations involving more than two fingers, more maxima will be detected with an appropriate number of intermediate minima.

Figure 4:
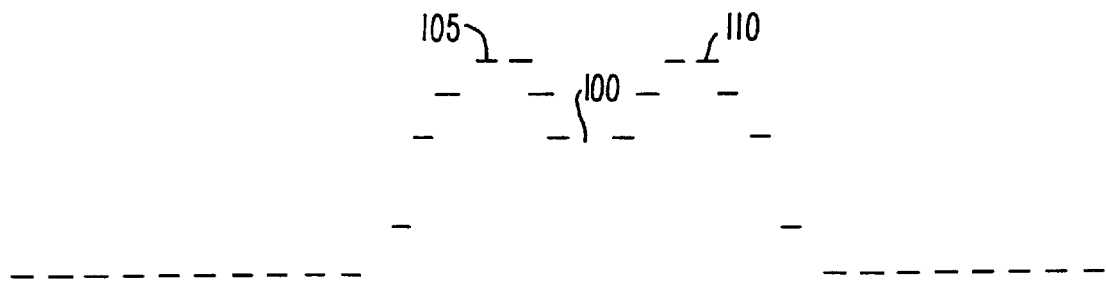
FIG. 4 shows a finger profile for two closely-spaced fingers as sensed by the present invention.

Although the finger profile shown in FIG. 3 suggests that the intermediate minima separating the two fingers is a zero value, it is not necessary in all instances that the minima be zero. Thus, for example, FIG. 4 reflects a finger profile with a nonzero local minima 100 intermediate the two maxima 105 and 110 indicative of two fingers operatively coupled to the touchpad. This finger profile simply reflects two fingers placed closely to one another, but still yields a valley for measurement of the minima.

To operate effectively, the present invention must detect and distinguish the presence of a single finger, and the presence of multiple fingers. As noted previously, the second or additional fingers are typically involved to provide "button" or control functions, similar to actuation of the buttons or switches on a mouse. Although the following example describes in detail the use of only two fingers, one for cursor control and a second as a button, the teachings herein are believed sufficient to permit those skilled in the art to construct apparata using multiple fingers for additional buttons.

To avoid artifacts, a threshold may be applied to the both the maximum and minimum distance between the maxima representative of multiple fingers. For example, a threshold requiring the maxima to be within five centimeters of one another may be used to limit the maximum distance between the fingers; other thresholds may be appropriate in some embodiments. A threshold representative of the minimum distance may be configured by establishing a maximum value of the local minima 100.

In an exemplary embodiment, the operation of the system of FIG. 2 is controlled in either firmware, software or hardware. Shown in FIG. 5 is a flow diagram showing the general operation of such software or firmware which is capable of detecting multiple fingers, and which uses the algorithm of FIG. 6, discussed hereinafter. The variables found in the flow diagram of FIG. 5 are defined below:

| Name | Definition |
| --- | --- |
| Xabsolute | Finger position in X direction, calculated during the current cycle relative to the sensor pad. |
| XabsolutePrevious | The value above stored from the previous cycle. |
| Yabsolute | Similar to Xabsolute. |
| YabsolutePrevious | Similar to XabsolutePrevious. |
| Xbutton | Has value Up or Down (regardless of previous state). |
| XbuttonPrevious | The value above stored from the previous cycle. |
| Ybutton | Similar to Xbutton. |
| YbuttonPrevious | Similar to XbuttonPrevious. |
| Xmotion | Cursor motion in the X direction, relative to the cursor position of the previous cycle (only reported if either or both Xmotion and Ymotion are non-zero). |
| Ymotion | Similar to Xmotion. |
| Button | May be Up or Down (only reported if a change from the previous cycle). |

It will be understood by those skilled in the art that a "report" means transmitting information to an application process executing on a host, such that the cursor is moved or a function is performed. In some instances, driver software executing on the host may ascertain the existence of finger movement, while in other instances including the exemplary embodiment described herein the determination of finger movement occurs in the firmware in the pointing device.

Referring still to FIG. 5, the cyclical process begins at step 400, and continues at step 410 by scanning the conductor sensors. The sensors may be scanned sequentially or concurrently, depending on the hardware implementation. The scan process measures the values of finger-induced capacitance for each of the conductors, and stores the values in RAM at step 420. The cycle process continues by performing the Xcompute loop of FIG. 6 discussed hereinafter, and also the Ycompute loop analogous to FIG. 6, at step 430 and 440, respectively. In general, the function of the Xcompute and Ycompute processes is simply to evaluate the current measurements by calculating the centroid of the finger measurement, and by detecting whether a second finger is touching the pad—which determines the button state.

In the exemplary embodiment, only a change in the button state is reported. As a result, at step 450 the value of Button is set to No Change. In addition, in the exemplary embodiment a tap or double click by only a first finger is not acted upon, although a tap by a second finger or by multiple fingers is acted upon. In the exemplary arrangement, a "button down" condition is only reported if both fingers are in operative contact with the touchpad.

The process continues by comparing the current and previous button states of the X and Y conductors. First, at step 460, the state of Xbutton is checked to see if it is Down and the state of XbuttonPrevious is checked to see if it is Up. If both compares are true, then the variable Button is set to Down at step 465. In addition, at step 470, the state of Ybutton is checked to see if it is Down and the state of YbuttonPrevious is checked to see if it is Up. If both compares are true, the variable Button is also set to Down.

Alternatively, as determined at step 480, if the state of Xbutton is Up and the state of XbuttonPrevious is Down, or, as checked at step 490, the state of Ybutton is up and YbuttonPrevious is Down, then the variable Button is set to Up at step 495.

If the button was set to Down at state 465, or Up at step 495, or if the results at steps 480 and 490 are NO, the process advances to step 510.

At step 510, Xmotion is set to the sum of Xabsolute less XabsolutePrevious, and at step 520, Ymotion is set to the sum of Yabsolute less YabsolutePrevious. Then, at step 530, the state of Button is checked and, if it is changed by being either Up or Down, both Xmotion and Ymotion are set to zero at step 535, indicating that the user has actuated a button and no cursor movement should occur.

In addition, if Button equals Up or Down, the state of Button is reported at step 540. At step 550, Xmotion and Ymotion are compared to zero, and if either is not zero then both Xmotion and Ymotion are reported to the microcontroller. It will be apparent that this indicates a cursor movement, typically reflective of the movement of a single finger over the touchpad, or two fingers in some modes such as Click-and-Drag.

Further, at step 560, whether there is motion reported or not, the variable XabsolutePrevious is set to the value of Xabsolute, and at step 570 the variable YabsolutePrevious is set to the value of Yabsolute. Similarly, at step 580 the value of XbuttonPrevious is set to Xbutton, and at step 590 the value of YabsolutePrevious is set to Yabsolute. The cycle then repeats by returning to step 400. It will be apparent that the foregoing algorithm can be readily extended to include additional fingers beyond two, representative of additional buttons. In such an instance, compare steps for current and previous states of each button would be conducted, and "up," or "down" conditions would be reported for each such button. In some embodiments it may be desired to report "no change" conditions, and the foregoing algorithm could be readily modified to provide such reporting.

Depending on the desired configuration, second and third buttons may be implemented, for example, either by requiring a combination of two or more fingers to indicate operation of a second button, or by the independent movement of additional fingers or other objects. In this latter embodiment, it may be desirable to implement distance thresholding, to ensure that movement of a second or additional button finger is not mistaken for movement of the first or other button finger.

Figures 1, 6:
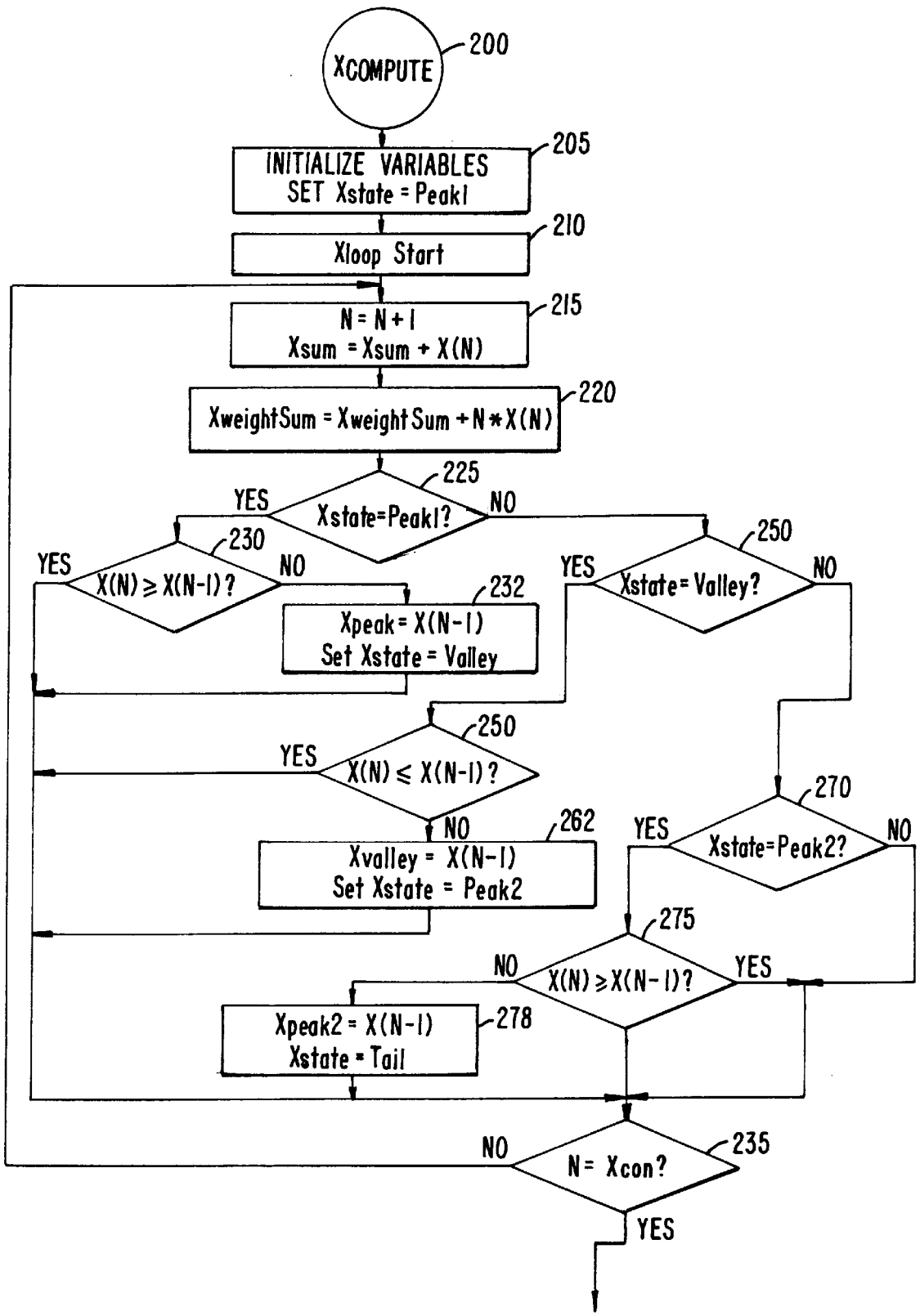
FIG. 6 shows in flow diagram form the steps for computing motion and "button" states.
Figures 2, 6:
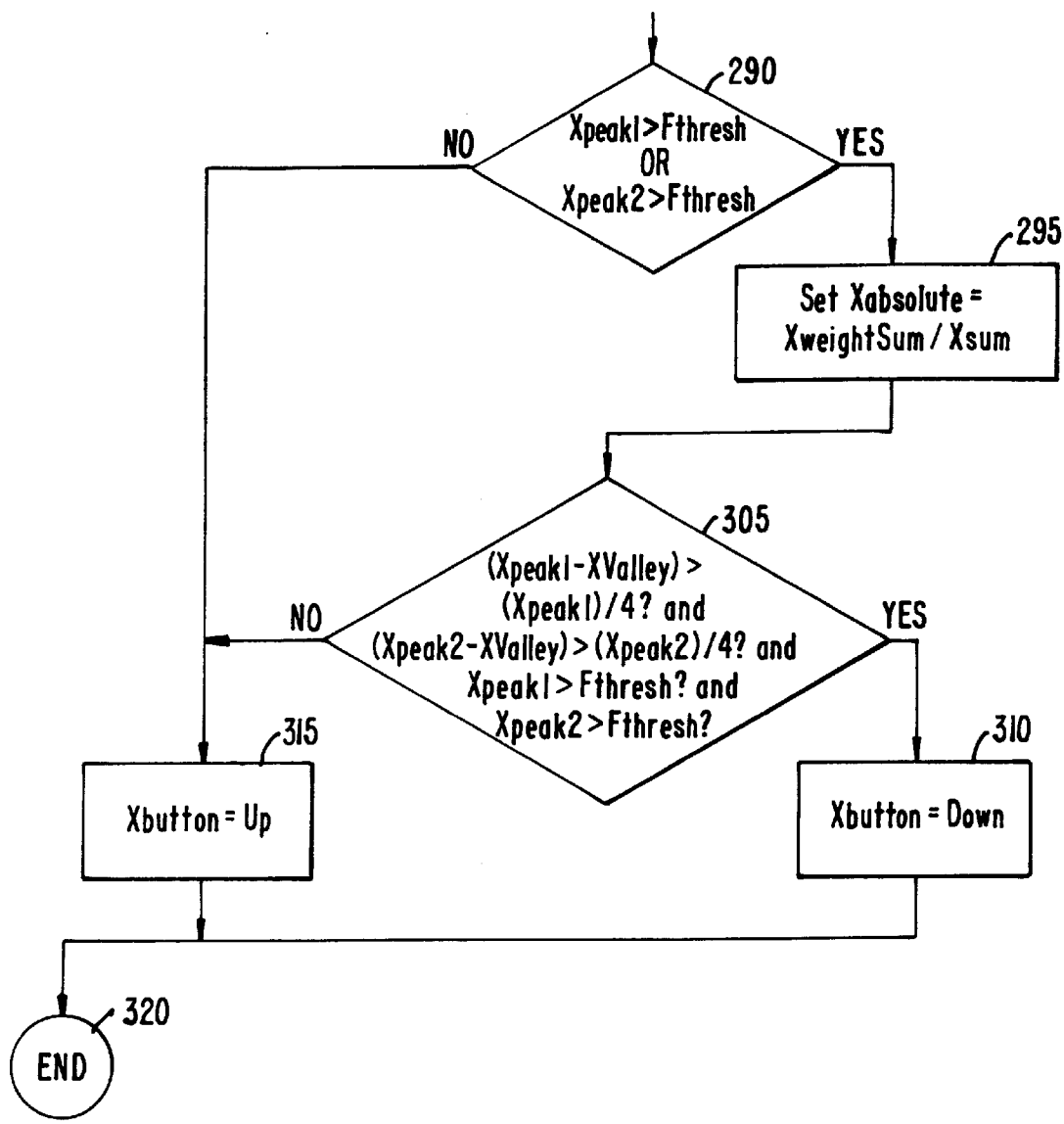

Set forth in FIG. 6 is a flow diagram setting forth the steps for computing motion and "button" states in the X direction, or what may be referred to as "Xcompute." An analogous calculation is performed for the Y direction, or what may be referred to as "Ycompute." The algorithm uses the following variables and constants:

| Name | Definition |
| --- | --- |
| X(N) | Values, stored in memory, of finger-induced portion of capacitance measured on each conductor. N varies from 1 to Xcon. [When no finger is contacting the pad above a conductor, the value is approximately zero. In addition, X(0) is initialized to a value of 0.] |
| X(N-1) | Value of finger-induced sensor conductor capacitance for the previous conductor. |
| Xcon | The number of sensor conductors in the X direction. |
| Fthresh | The minimum threshold that X must reach before a finger is considered to be present. [Sets the touch sensitivity of the pad.] |
| Xpeak1 | Variable to store the value of the first peak X value. |
| Xvalley | Variable to store the value of a local minimum (if any) between 2 peaks. |

| Name | Definition |
|---|---|
| Xpeak2 | Variable to store the value of the second peak X value (if any). |
| Xsum | Variable to accumulate the sum of the X values, for centroid calculation. |
| XweightSum | Variable to accumulate the sum of the X values, weighted by N (the position of the conductor), for centroid calculation. |
| Xstate | A variable which can have values Peak1, Valley, Peak2 or Tail, to indicate which part of the finger profile we are currently searching for. The Tail state is simply the remainder of the scan after a second peak (in the exemplary embodiment) has been identified. |

It will be apparent to those skilled in the art that the "Ycompute" variables and constants differ only in replacing X by Y.

The algorithm for Xcompute starts at step 200, followed by initialization of variables at step 205. For Xcompute, the variables initialized are N, which is set to zero, and the value of X(0), which is also set to zero. In addition, Xpeak1, Xvalley, Xpeak2, Xsum and XweightSum, are all set to zero. In addition, the state of Xstate is set to Peak1.

At step 210 a loop, referred to as "Xloop" starts. The purpose of Xloop is to calculate the X centroid, by accumulating the sum and weighted sum of the X values for all the X conductors from one to Xcon. Thus, the loop typically starts with the value of N=0 and increments by one at the beginning of each cycle until the value of N=Xcon. The steps of the loop include step 215, where N is incremented to N+1 and the value X(N) of the current conductor is added to the prior accumulated value, Xsum, which then becomes the new value of Xsum. The loop then continues at step 220, where the prior value of XweightSum is added to a weighted value of X(N), where the weighting is done by multiplying X(N) by the number N of the conductor being sampled. The sum of XweightSum and N*X(N) then becomes the new value of XweightSum.

The XLoop continues at step 225, where one of a series of subloops is selected depending on the value of Xstate. Since Xstate is initially set to Peak1, the first subloop entered is the Peak1 subloop, beginning at step 230. At step 230 the value of X(N) is compared to the value of X(N−1) and, if X(N) is greater than or equal to the value of X(N−1), the first peak has not yet been reached. As a result, the loop jumps to step 235, at which points the value of N is compared to the value of Xcon. If the finger-induced capacitance measured at the last conductor has not been evaluated, the result is a NO and the process jumps to step 215 to repeat with an incremented value of N.

At some value of N the value of X(N) is less than the value of X(N−1), at which point the check at step 230 yields a NO. At this point, the peak has been found and at step 232 the value of Xpeak1 is set to X(N−1) and the value of Xstate is set to Valley. The system then jumps to step 235, where a check is made to see if the last conductor has been measured by comparing N to Xcon. As before, if the capacitance change measured at the last conductor has not been checked, the result is a NO, and the process loops to step 215 and repeats.

When the process begins with the next increment of N, a NO will result at step 225, so that the process will jump to step 250, where a check is made to see if Xstate equal Xvalley. Since it now does, a YES results and the process branches to step 255. At step 255 a X(N) is compared to X(N−1). If X(N−1) is not greater than or equal to X(N), the valley has not yet been found, causing a further jump to step 235 and a repeat with an incrementally higher N. If a second finger is touching the pad then eventually the value of X(N−1) will be geater than or equal to the value of X(N), such that the valley is detected. At this point, at step 262, the value of Xvalley is set to X(N−1) and Xstate is set to Peak2. The process then jumps to step 235, where it repeats from step 215 unless the last conductor in the matrix has been evaluated.

On the next cycle, a NO result is reached at both step 225 and step 250, causing a jump to step 270. At step 270 the state of Xstate is compared to Peak2, and a YES result will occur. This results in a compare between X(N) and X(N−1) at step 275, to look for a second peak, in a manner substantially identical to the process by which the first peak was found. As long as X(N) is greater than or equal to X(N−1), the peak has not been found, so the process jumps to step 235, and then to step 215 until the change measured at the last conductor has been evaluated.

As before, the value of X(N) will eventually start to decrease, such that X(N) will be less than X(N−1). At this point, at step 278, the value of Xpeak2 is set to the value of X(N−1) and the state of Xstate is set to Tail. The "tail" is the remaining portion of FIG. 4 following the second peak. While a Tail state is used in the exemplary embodiment, such a state may not be necessary in all embodiments.

The process then cycles through until the last conductor measurement has been considered, at which point N does equal Xcon when the check at step 235 is made. With a YES result, the process branches to a thresholding comparison at step 290.

In an exemplary embodiment, the Xcompute process then continues by calculating the centroid for the fingers detected, so long as the maxima exceed a threshold value. In accordance with the present invention, two approaches may be used in calculating centroid values. In a first implementation, only a single centroid value is calculated for the combination of one or more fingers. In this arrangement, it will be apparent that, when a second finger contacts the touchpad, the centroid "jumps" laterally approximately to the midpoint of the two fingers. In a second implementation, a centroid value may be calculated for each maxima, yielding multiple centroid values when multiple fingers interact with the pad. For purposes of clarity, the following description will be limited to the first implementation.

Thus, at step 290 the values of Xpeak1 and Xpeak2 are compared to Fthresh, and if either or both are greater then Xabsolute is set to the value of XweightSum/Xsum at step 295, which causes the X centroid to be calculated. If neither peak exceeds Fthresh, then no finger is deemed present and Xbutton is set to Up at step 315.

If both Xpeak1 and Xpeak2 were greater than Fthresh, the Xcompute process continues at step 305 by comparing the difference between Xpeak1 and Valley to the value of Xpeak1 divided, for example, by four. If the difference is the greater of the two, then the difference between Xpeak2 and Valley is compared to the value of Xpeak2 divided, for example, by four. If the difference is greater than the dividend, the Xbutton is set to Down at step 310. Otherwise, the value of Xbutton is set to Up at step 315. The comparison described above is provided to ensure that a legitimate valley and two legitimate peaks have been detected, to avoid artifacts. It will be appreciated, given the teachings herein, that other comparison methods or divisors other than four may be used for this purpose.

The Xcompute loop then ends at step 320. It will be appreciated by those skilled in the art that the foregoing is a simplified algorithm and does not include compensation for settling, moisture and noise. Noise thresholding may be provided in at least some embodiments, if noise causes the curve to be non-monotonic; settling and moisture may be dealt with in a similar manner.

The Ycompute loop is performed similarly, as noted above. Depending on the particular arrangement desired, and the associated hardware, the X and Y compute processes may be performed sequentially in either order or concurrently.

While the foregoing example describes identification of minima and maxima in the X and Y directions, it will be apparent that an analysis along a diagonal or some other angular direction may be preferred in some instances, and is still within the scope of the present invention.

It will be appreciated that the foregoing describes a new and useful method and apparatus for detecting a plurality of fingers operatively coupled to a touch pad sensor for enabling a variety of mouse-like operations. A second portion of the invention involves using the previously detection methodology to perform various cursor movement and control functions similar to those well known to users of electronic mice and trackballs.

As previously noted, the first finger is most commonly associated, in the prior art, with cursor movement, while various tapping motions [e.g., tap and tap-and-a half] of that first finger have been implemented to perform various control functions. Unlike such prior art, however, various movements (including sequences of taps) of additional fingers or combinations of the first and additional fingers are provided to enable such control functions in the present invention. Depending on the implementation desired, it is also possible to implement a superset of the prior art control functions together with the more robust control function set available with the present invention.

Note that in the preferred embodiment, the user may arbitrarily choose which finger he or she uses as the "first" or "second" or additional fingers. Thus, for example, one user may choose the index finger as the first finger and the middle finger as the second finger, while another user may prefer the reverse or some different combination. In the preferred embodiment, the only distinction between the first, second and additional fingers is the sequence in which they are placed in contact with the touchpad surface, or removed from it. In any case where a second or additional finger or fingers is placed down after a first finger, or multiple fingers, is already in contact with the pad, the newly placed fingers can be in any relationship to those already in contact with the pad, such as to the left, to the right, above or below. The only requirement is that, in the profile of finger-induced capacitances, the profile of the newly placed finger exhibits a zero value or a local minimum on each side of its peak value, in at least one of the X or Y directions, so that it may be distinguished from the other finger(s) in contact with the touchpad.

In particular, the ability of the previously described methodology to recognize multiple fingers allows the first finger to serve, essentially, as the "point" finger, while additional fingers serve as the "click" finger(s). Combinations of the first, second, and perhaps additional fingers can then enable numerous conventional functions to be performed based on the mapping of a variety of sequences of taps or finger movements to a set of conventional pointing device functions, where the pointing device could be a touchpad, mouse, trackball, joystick, or stylus, for example. It will be apparent to those skilled in the art, given the foregoing description, that the present invention can detect, for example, relative movement of the first finger, together with a tap of the second or more fingers at some point, followed either by removal of both fingers, further movement of the first finger, or further movement of both fingers. Such sequences can, essentially, be viewed as a series of scans in which one or more fingers were found to be either present or absent in any given scan, with motion, or lack thereof, of the finger or fingers across the touch sensor interspersed between changes in the number of fingers in contact with the touchpad. The specific sequence can then be analyzed to determine whether only a cursor movement is involved or whether a control function is intended. If a control function is intended, the specific control function can then be identified.

Referring to FIGS. 7A–7F, there is shown in diagrammatic form an exemplary sequence involving operative coupling of a plurality of fingers with a touch sensor to cause both a cursor movement and a control function. More specifically, FIG. 7A shows a series of movements of one or more fingers across a touch sensor, including various finger taps. FIGS. 7B–7F show, for each of the numeric references in FIG. 7A, an exemplary video display, an exemplary position of one or more fingers on the touchpad, and X and Y finger profiles appropriate to that finger contact. It will be helpful to define certain conventions used in FIGS. 7A–7F before discussing these figures. In FIG. 7A–7F, contact between a finger and the touch pad is indicated by a solid circle within the fingertip; an absence of contact between a fingertip and the touch sensor is indicated by the absence of circle within the finger tip. A tap—i.e., an up and down motion—by a finger is indicated by a dashed circle. Movement of the fingers from a first to a second point while in contact with the touch sensor is indicated by a solid arrow. Movement of the fingers from a first to a second point with the fingers not in contact is indicated by a dashed arrow. With these conventions in mind, FIGS. 7A–7F can be better understood.

In particular, and with reference to FIG. 7A in combination with FIG. 7B, an initial series of scans 700 indicates the presence of a single finger in contact with the touch sensor, with the changing X,Y location between 700 and 705 indicating relative motion by the finger across the touch sensor. At 710, a second finger is detected in contact with the touch sensor, and continues to be operatively coupled to the sensor for several more scans without significant relative motion across the sensor. At 720, the second finger is removed, while the first finger remains. From 720 until 730 (shown in FIG. 7C) the first finger continues its relative motion, while at 740 the second finger is again placed down. The scans of the sensor then detect both the first and second finger being moved together across the sensor until the scan at 750, then both fingers are removed at 755. Thereafter, both fingers are again placed on the sensor at 760 (shown in FIG. 7D), where they remain for a few more scans until 770, at which time they are both removed. Three fingers are placed on the sensor at 780, and removed a few scans later at 790. Thereafter, three fingers are placed on the sensor at 800 (FIG. 7E), moved across the touch sensor for a few scans from 800 to 805, and are then removed at 810. Finally, as shown at 820 (FIGS. 7F1–2), one finger is placed down while the adjacent finger is moved, such as might be desirable for marking text or other functions. When the finger is moved as far as is practicable, the moving finger is picked up at 825 and placed down again at 830 for further movement. The moving finger can be picked up and placed down again as often as desired. Eventually the other, substantially fixed finger is lifted at 835, causing a "button up" condition.

While the foregoing sequence can be programmed to define any number of cursor movement and control functions, an exemplary definition of the functions associated with such sequences can be the following: For the period from 700 through 705 the relative motion of a single finger can be defined to mean cursor movement for that period, from the beginning point until the relative ending point. During the period 710 to 720, a second finger is detected and then removed, which is defined in an exemplary embodiment as a single finger tap which may be a "select" function such as selecting one item from a screen menu. During the period 720 until 730, the single finger again moves the cursor, while at 740 the second finger reappears to enable a different function. The second finger moves across the sensor, together with the first finger, until at 755 both fingers are removed. Again, such sequences—all of which may be regarded as gestures—can be mapped to control functions in numerous ways, but one reasonable definition is that the presence of two fingers engaged in relative motion is a "drag function," such as where an entity was selected by the first tap and dragged to a new location, where it is dropped by the removal of both fingers at 750.

Then, at 760, both fingers reappear and remain for a few additional scans until both are removed at 770. This gesture, which may be considered a "two finger tap," can enable numerous functions, but an exemplary definition is the classical "double-click" of a standard left mouse button, or the click of a middle button on some three button mice, such as those sold by Logitech, Inc., and could, for example, activate a function or application associated with the item to which the cursor is pointing.

Next, the sequence from 780 to 790, when the three fingers reappear and are then removed, is a "three finger tap", and can be regarded, for example, as a right mouse button click which may, for example, activate a menu specific to the item to which the cursor is pointing. Finally, the sequence from 800 until 810, in which three fingers reappear, move across the touch sensor and are then removed, may in an exemplary embodiment be seen as a shortcut to a multi-sequence function. For example, such a movement might be defined as a scroll function, which might otherwise require the user to move the cursor to a scroll bar, drag and drop a scroll box, and return the cursor to the working area of the screen. Finally, the sequence from 820 through 830 can be analogized to holding down a mouse button (for example the left mouse button), rolling a mouse whatever distance is convenient for the user, then picking up the mouse (while continuing to hold down the button) and placing the mouse down again at a position convenient for further movement of the mouse. One example of the use of such a sequence is the marking of text. The algorithm for recognizing movement by one "cursor" finger while the other "button" finger is maintained in position is a generalized case of the algorithm shown in FIGS. 5 and 6, and is described in greater detail in FIGS. 8 and 9. Other functions which can be implemented with such gestures include an "ink" function (mentioned above), entry of variable values, and use of the sensor in absolute mode.

Referring next to FIGS. 8 and 9, the generalized case associated with FIGS. 7F1–2, but also applicable to the remaining functions, may be better appreciated. In the exemplary algorithm shown in FIGS. 8 and 9, a determination is made whether zero, one or two fingers are in contact with the touchpad. Depending on how many fingers are identified, various operations are permitted. It will be appreciated that FIG. 8 is analogous to FIG. 5, while FIG. 9 is analogous to FIG. 6. For convenience, steps unchanged from FIGS. 5 and 6 are in most cases referred to by the reference numerals used in those figures.

In FIG. 8, the process begins in a manner identical to FIG. 5, starting at step 400 and followed by scanning the conductors and storing the results of the scan in memory at step 405, followed by Xcompute and Ycompute at steps 430 and 440, respectively. For this embodiment, Xcompute is shown in FIG. 9, and Ycompute is identical to Xcompute. At step 850, a determination is made whether two fingers are in contact with the touchpad by evaluating both Xcompute and Ycompute. If neither Xcompute nor Ycompute indicate the presence of two fingers, the answer is NO and the process drops to step 855. However, if either the Xcompute routine or the Ycompute routine indicates the presence of two fingers, the answer at step 850 is YES and the process moves to step 860, where the value of the variable FINGER is set to 2.

If the answer at step 850 was NO, then a determination has to be made at step 855 whether one or no fingers are in contact with the touch sensor. If variables Xfinger and Yfinger do not both equal 1, then the comparison at step 850 is a NO and it is determined that no fingers are in contact with the touch sensor. In this case, the variable FINGER is set to 0 at step 865. However, if the variables both yield a 1, then a determination is made that one finger is in contact with the sensor, and the variable FINGER is set to 1 at step 870.

In either event, the process then moves to step 875, where Xmotion and Ymotion are calculated in a manner identical with FIG. 5. The process then continues at step 880, where the variable Finger is compared to the value of FingerPrevious. If the value of Finger differs from the value of FingerPrevious, then a button actuation is assumed to have occurred, and Xmotion and Ymotion are set to zero at step 885. However, if the value of Finger equals the value of FingerPrevious (i.e., the current number of fingers contacting the pad is the same as in the previous state), then the comparison of step 880 yields a YES, and the process moves to step 890. At step 890 a comparison is made to determine whether there has been motion in either the X or Y directions. If neither Xmotion nor Ymotion is nonzero, a NO results and the process moves to step 895 where the variable Motion is set to NO. The same results obtains if the process goes through step 885. However, if either Xmotion or Ymotion is nonzero, a YES results at step 890, and the process moves to step 900 where the variable Motion is set to YES.

From either step 895 or step 900, the process moves to step 905, where a check is made to determine whether ButtonPrevious was up and the number of fingers detected is two. If the answer is NO, the process moves to step 910. However, if a YES is obtained, the process moves to step 915 where the state of the Button variable is reported to the host as DOWN, and the variable ButtonPrevious is set to Down.

Referring again to step 910, a check is made to determine whether either of two groups of conditions exist. A YES result may be obtained if ButtonPrevious is DOWN and and the value of the Finger variable is zero; or if ButtonPrevious is Down and the variable Motion is set to YES and the variable Finger is set to one. If none of these conditions exist, a NO result is obtained and the process moves to step 920. However, if a YES does result, then the process moves to step 925 and reports to the host that Button is Up, while also setting the variable ButtonPrevious to Up.

If a NO resulted at step 910, at step 920 a comparison is made between variables FingerPrevious and Finger, and the state of the Motion variable. If FingerPrevious is the same value as Finger, and Motion has occurred (i.e., Motion is Yes), the process moves to step 930 and both Xmotion and Ymotion are reported. The process then moves to step 935. However, if the comparison at step 920 yields a No, the process moves directly to step 935. At step 935, the value of XabsolutePrevious is set to the value of Xabsolute, the value of YabsolutePrevious is set to the value of Yabsolute, and the value of FingerPrevious is set to the value of Finger. The process then moves to step 940, where it recycles by jumping back to start.

Referring next to FIG. 9, the Xcompute process is shown in detail for the generalized case shown in FIG. 8. As noted previously, the Ycompute process is identical and is therefore not shown separately. The process of FIG. 9 is identical to that shown in FIG. 6 up through step 290, and the preceding steps will therefore not be discussed again. However, if a No results from the comparison at step 290, a determination is made that no fingers are in contact with the pad. This causes the variable Xfinger to be set to zero at step 970.

Steps 295 and 305 are unchanged from FIG. 6 and will not be discussed further. However, if a No results from the comparison at step 305, then a determination is made that one finger is in contact with the sensor, and the value of the variable Xfinger is set to one at step 975. By contrast, if the result at step 305 is a Yes, then a determination is made that two fingers are in contact with the sensor and the variable Xfinger is set to two at step 980. Regardless of the number of fingers in contact with the sensor, the process moves to step 320 and ends until the next cycle.

Another function achievable with the detection method and apparatus of the present invention may be referred to as edge lock. Because a touch sensor can detect, in absolute terms, where on the sensor the operative coupling occurs, it is possible to detect that one or more fingers have reached the edge of the sensor. In some instances, the user intends to continue the movement he was engaged in when he hit the edge; for example, a drag function involving two fingers, in which the two fingers hit the edge before the object being dragged has reached its destination. In the environment of a mouse, the user simply picks up the mouse while holding the button down, puts it back down and moves again. In the context of a touchpad, however, removal of the two fingers may be perceived as termination of the function even though such termination was not intended. To avoid such problems, the function in which the user was engaged at the time the fingers hit the edge may remain active—i.e., locked in—for a delay period. If the fingers are placed down on the touchpad within the delay period, the user continues with the earlier function. If the user does not place down the fingers within a predefined delay, the function is terminated and a new function begins when the user again places the fingers in operative contact with the sensor.

It will be appreciated from the foregoing that the present invention allows numerous multi-finger gestures to be detected and converted to mouse-related functions for moving a cursor and control of operating environments or applications programs. However, while some exemplary functions and exemplary definitions for particular sequences have been provided above, it is to be understood that the present invention is not limited to the association of a particular function with a particular sequence or to any particular set of functions. Instead this aspect of the invention is directed to the ability to identify and process various sequences in which one or more fingers are either absent or present, interspersed with motion or lack of motion of the finger or fingers across the touch sensor, to evaluate those sequences either locally or via software on the host, and to report appropriate signals to cause cursor movements or control functions to occur in applications programs or operating environments.

Having fully described various embodiments of the present invention, numerous alternatives and equivalents which do not depart from the invention will be apparent to those skilled in the art. It is therefore intended that the invention not be limited by the foregoing description, but only by the appended claims.

What is claimed is:

1. A method for detecting the operative coupling of multiple fingers to a touch sensor involving the steps of scanning the touch sensor to (a) identify a first maxima in a signal corresponding to a first finger, (b) identify a minima following the first maxima, (c) identify a second maxima in a signal corresponding to a second finger following said minima, and providing an indication of the simultaneous presence of two fingers in response to identification of said first and second maxima.

2. The method of claim 1 further including the step of causing a pointing device click function to occur in response to the detection of at least a second maxima.

3. The method of claim 1 further including the step of enabling a "drag" function to occur in response to the detection of at least a second maxima.

4. The method of claim 1 further including the step of enabling a "select" function in response to the detection of at least a second maxima.

5. The method of claim 1 further including the step of enabling an "ink" function in response to the detection of at least a second maxima.

6. The method of claim 1 wherein said touch sensor includes a plurality of lines, said maxima being a largest local variation in a signal value on one of said lines due to capacitive coupling of a finger.

7. The method of claim 6 wherein said maxima are peaks.

8. The method of claim 1 further comprising the step of comparing a distance between said first maxima and said second maxima to a predefined threshold.

9. The method of claim 1 further comprising the steps of:

providing a first control function in response to the detection of the movement of two fingers:

detecting the reaching of an edge of said touch sensor by said two fingers;

detecting a first time corresponding to the removal of said fingers from said touch sensor;

detecting a second time corresponding to the replacement of said two fingers on said touch sensor; and continuing said first control function if said first and second times are within a predetermined time limit of each other.

10. The method of claim 1 further comprising the step of:

detecting a distance between said first and second maxima.

11. The method of claim 1 further comprising the step of:

providing a drag control function in response to detecting a movement in substantial unison of two said fingers.

12. The method of claim 1 further comprising the step of:

providing a click function in response to the removal and reappearance of said second maxima within a predetermined period of time.

13. The method of claim 1 further comprising the steps of:

detecting a movement of said first maxima;

detecting a removal and replacement of said maxima within a predetermined time period;

controlling a cursor function in response to said movement of said first maxima; and providing a control function in response to said removal and replacement of said second maxima.

14. The method of claim 1 further comprising the step of:

selecting an appropriate control function based on a combination of a number of fingers detected, an amount of time said fingers are detected, and any movement of said fingers.

15. The method of claim 1 further comprising the step of determining if said first and second maxima are within 5 centimeters, and only providing said indication of the presence of two fingers if said first and second maxima are within 5 centimeters.

16. The method of claim 1 further comprising the step of calculating first and second centroids corresponding to said first and second fingers.

17. The method of claim 1 wherein said first and second maxima are required to be higher than a first threshold, and said minima is required to be less than a second threshold.

18. A touch sensor for detecting the operative coupling of multiple fingers comprising:

means for scanning the touch sensor to (a) identify a first maxima in a signal corresponding to a first finger, (b) identify a minima following the first maxima, and (c) identify a second maxima in a signal corresponding to a second finger following said minima, and means for providing an indication of the simultaneous presence of two fingers in response to identification of said first and second maxima.

19. The touch sensor of claim 18 further comprising:

means for selecting an appropriate control function based on a combination of a number of fingers detected, an amount of time said fingers are detected, and any movement of said fingers.

20. The touch sensor of claim 18 wherein said touch sensor includes a plurality of lines, said maxima being a largest local variation in a signal value on one of said lines due to capacitive coupling of a finger.

21. The touch sensor of claim 18 wherein said maxima are peaks.

22. The touch sensor of claim 18 further comprising means for comparing a distance from said first maxima to said second maxima to a predefined threshold.

23. The touch sensor of claim 18 further comprising:

means for providing a first control function in response to the detection of the movement of two fingers:

means for detecting the reaching of an edge of said touch sensor by said two fingers;

means for detecting a first time corresponding to the removal of said fingers from said touch sensor;

means for detecting a second time corresponding to the replacement of said two fingers on said touch sensor; and means for continuing said first control function if said first and second times are within a predetermined time limit of each other.

24. The touch sensor of claim 18 further comprising:

means for detecting a distance between said first and second maxima.

25. The touch sensor of claim 18 further comprising:

means for providing a drag control function in response to detecting a movement in substantial unison of two said fingers.

26. The touch sensor of claim 18 further comprising:

means for providing a click function in response to the removal and reappearance of said second maxima within a predetermined period of time.

27. The touch sensor of claim 18 further comprising:

means for detecting a movement of said first maxima;

means for detecting a removal and replacement of said maxima within a predetermined time period;

means for controlling a cursor function in response to said movement of said first maxima; and means for providing a control function in response to said removal and replacement of said second maxima.

28. The touch sensor of claim 18 further comprising:

means for selecting an appropriate control function based on a combination of a number of fingers detected, an amount of time said fingers are detected, and any movement of said fingers.

29. The sensor of claim 18 further comprising means for determining if said first and second maxima are within 5 centimeters, and only providing said indication of the presence of two fingers if said first and second maxima are within 5 centimeters.

30. The sensor of claim 18 further comprising means for calculating first and second centroids corresponding to said first and second fingers.

31. The sensor of claim 18 wherein said first and second maxima are required to be higher than a first threshold, and said minima is required to be less than a second threshold.

* * * * *